(12) United States Patent
McComish et al.

(10) Patent No.: US 9,163,179 B2
(45) Date of Patent: Oct. 20, 2015

(54) SYSTEM AND METHOD FOR PRODUCTION OF FISCHER-TROPSCH SYNTHESIS PRODUCTS AND POWER

(71) Applicants: Bruce E. McComish, Mitchell, SD (US); Benjamin H. Carryer, Dubuque, IA (US); Bryan C. Borum, Commerce City, CO (US); Weibin Jiang, Aurora, CO (US); Mark D. Ibsen, Highlands Ranch, CO (US); Mark K. Robertson, Denver, CO (US); Eric R. Elrod, Arvada, CO (US); Sim Weeks, Duluth, GA (US); Harold A. Wright, Longmont, CO (US)

(72) Inventors: Bruce E. McComish, Mitchell, SD (US); Benjamin H. Carryer, Dubuque, IA (US); Bryan C. Borum, Commerce City, CO (US); Weibin Jiang, Aurora, CO (US); Mark D. Ibsen, Highlands Ranch, CO (US); Mark K. Robertson, Denver, CO (US); Eric R. Elrod, Arvada, CO (US); Sim Weeks, Duluth, GA (US); Harold A. Wright, Longmont, CO (US)

(73) Assignee: RES USA, LLC, Commerce City, CO (US)

( * ) Notice: Subject to any disclaimer, the term of this patent is extended or adjusted under 35 U.S.C. 154(b) by 428 days.

(21) Appl. No.: 13/661,807

(22) Filed: Oct. 26, 2012

(65) Prior Publication Data

US 2013/0165534 A1 Jun. 27, 2013

Related U.S. Application Data

(60) Provisional application No. 61/578,761, filed on Dec. 21, 2011.

(51) Int. Cl.
*C07C 27/00* (2006.01)
*C10G 2/00* (2006.01)

(Continued)

(52) U.S. Cl.
CPC ........ *C10G 2/32* (2013.01); *C10G 2/332* (2013.01); *C10G 2/34* (2013.01); *C10J 3/482* (2013.01); *C10J 3/721* (2013.01); *C10K 1/004* (2013.01); *C10K 3/001* (2013.01); *C10K 3/005* (2013.01); *C10G 2400/02* (2013.01); *C10G 2400/06* (2013.01); *C10J 3/84* (2013.01); *C10J 2300/0916* (2013.01); *C10J 2300/0993* (2013.01); *C10J 2300/0996* (2013.01);

(Continued)

(58) Field of Classification Search
CPC .......... C10G 2/32; C10K 1/004; C10K 3/005; C10J 3/482; C10J 3/721; C10J 2300/1807; C10J 2300/0916; C10J 2300/165; C10J 2300/1659; Y02E 20/16

See application file for complete search history.

(56) References Cited

U.S. PATENT DOCUMENTS

| 4,828,581 A | 5/1989 | Feldmann et al. |
| 5,508,118 A | 4/1996 | Hayashi et al. |

(Continued)

OTHER PUBLICATIONS

Jiang et al., Provisional U.S. Appl. No. 61/551,582, filed Oct. 26, 2011 for corresponding U.S. Application (73 pgs.).

(Continued)

*Primary Examiner* — Jafar Parsa
(74) *Attorney, Agent, or Firm* — Timothy S. Westby; Porter Hedges LLP

(57) ABSTRACT

A method for generation of power and Fischer-Tropsch synthesis products by producing synthesis gas comprising hydrogen and carbon monoxide, producing Fischer-Tropsch synthesis products and Fischer-Tropsch tailgas from a first portion of the synthesis gas, and generating power from a second portion of the synthesis gas, from at least a portion of the Fischer-Tropsch tailgas, or from both. The method may also comprise conditioning at least a portion of the synthesis gas and/or upgrading at least a portion of the Fischer-Tropsch synthesis products. A system for carrying out the method is also provided.

33 Claims, 3 Drawing Sheets

(51) Int. Cl.
  *C10K 1/00*   (2006.01)
  *C10K 3/00*   (2006.01)
  *C10J 3/48*   (2006.01)
  *C10J 3/72*   (2006.01)
  *C10J 3/84*   (2006.01)
  *C10K 1/02*   (2006.01)

(52) U.S. Cl.
  CPC .... *C10J2300/165* (2013.01); *C10J 2300/1637* (2013.01); *C10J 2300/1659* (2013.01); *C10J 2300/1807* (2013.01); *C10K 1/026* (2013.01); *Y02E 20/16* (2013.01)

(56) References Cited

U.S. PATENT DOCUMENTS

| | | |
|---|---|---|
| 5,733,941 A | 3/1998 | Waycuilis |
| 6,306,917 B1 | 10/2001 | Bohn et al. |
| 7,579,756 B2 | 8/2009 | Althoff et al. |
| 8,241,523 B2 | 8/2012 | Apanel |
| 2003/0083391 A1 | 5/2003 | Jahnke et al. |
| 2008/0223046 A1 | 9/2008 | Yakobson et al. |
| 2009/0062108 A1 | 3/2009 | Demirel et al. |
| 2009/0075814 A1 | 3/2009 | Duvenhage et al. |
| 2009/0298678 A1 | 12/2009 | Demirel et al. |
| 2010/0109338 A1* | 5/2010 | Yakobson et al. ............ 290/1 A |
| 2010/0181539 A1 | 7/2010 | Apanel et al. |
| 2010/0311570 A1 | 12/2010 | Duvenhage et al. |
| 2011/0290490 A1* | 12/2011 | Kaminsky et al. ............ 166/302 |

OTHER PUBLICATIONS

International Preliminary Report on Patentability dated Jul. 3, 2014 for International Application No. PCT/US2012/062079 (16 pgs.).

Search Report and Written Opinion dated Mar. 18, 2013 for International Application No. PCT/US2012/062079 (19 pgs.).

* cited by examiner

SYSTEM AND METHOD FOR PRODUCTION OF FISCHER-TROPSCH SYNTHESIS PRODUCTS AND POWER

CROSS-REFERENCE TO RELATED APPLICATIONS

This application claims the benefit under 35 U.S.C. §119 (e) of U.S. Provisional Patent Application No. 61/578,761, filed Dec. 21, 2011, the disclosure of which is hereby incorporated herein by reference.

STATEMENT REGARDING FEDERALLY SPONSORED RESEARCH OR DEVELOPMENT

Not applicable.

BACKGROUND

1. Field of the Invention

This disclosure relates generally to the field of Fischer-Tropsch synthesis. More specifically, the disclosure relates to a system and method for the co-production of Fischer-Tropsch synthesis products and power. Still more specifically, the disclosed system and method enable substantially constant generation of Fischer-Tropsch synthesis products and/or power via utilization of an adjustable flow synthesis gas bypass stream that bypasses Fischer-Tropsch synthesis for use in power production.

2. Background of Invention

Gasification is utilized to produce process gas suitable for the production of various chemicals, for the production of Fischer-Tropsch liquid hydrocarbons, and for the production of power. Many feed materials may serve as carbonaceous sources for gasification, including, for example, shredded bark, wood chips, sawdust, sludges (e.g., sewage sludge), municipal solid waste (MSW), refused derived fuel (RDF), and a variety of other carbonaceous materials.

Fischer-Tropsch (FT) synthesis represents a catalytic method for the creation of synthetic waxes, liquids, fuels, and gases. The reaction occurs by the use of metal catalysis in an exothermic reaction between carbon monoxide and hydrogen gas in mixtures known as synthesis gas, or 'syngas'. The liquid product of the reaction is typically refined to produce a range of synthetic fuels, lubricants and waxes. The primary metals utilized as catalysts are ruthenium, cobalt and iron. Providing synthesis gas having a desired molar ratio of hydrogen to carbon monoxide is necessary for economic production of Fischer-Tropsch synthesis products and long term catalyst stability.

There is a need in the art for improved systems and methods of Fischer-Tropsch synthesis, whereby power and Fischer-Tropsch synthesis products may be co-generated, similar to poly-generation, and wherein the amount of Fischer-Tropsch synthesis products produced, the amount of power generated, or both may be maintained at desired levels even when the quantity and/or composition of the synthesis gas changes, for example due to a change in gasification feed material(s) and/or the value of the products being produced (i.e. power and/or FT products).

SUMMARY

Herein disclosed is a method for generation of power and Fischer-Tropsch synthesis products, the method comprising: producing synthesis gas comprising hydrogen and carbon monoxide; producing Fischer-Tropsch synthesis products and Fischer-Tropsch tailgas from a first portion of the synthesis gas; and generating power from a second portion of the synthesis gas, from at least a portion of the Fischer-Tropsch tailgas, or from both. In embodiments, the method comprises generating power from both a second portion of the synthesis gas and at least a portion of the Fischer-Tropsch tailgas. In embodiments, the method comprises increasing or decreasing an overall production rate of the synthesis gas. In embodiments, the method comprises adjusting at least one parameter selected from the group consisting of the first portion, the second portion, the ratio of the first portion to the second portion, and combinations thereof. In embodiments, the method comprises adjusting the at least one parameter such that the generation of power remains substantially constant; the production of Fischer-Tropsch synthesis products remains substantially constant; or both. In embodiments, the production rate of the synthesis gas is decreased, optionally by decreasing an amount of carbonaceous feedstock gasified to produce the synthesis gas. In embodiments, the method comprises reducing the second portion, and substantially maintaining the first portion, such that the production of Fischer-Tropsch synthesis products remains substantially constant. In embodiments, the method comprises reducing the first portion, and substantially maintaining the second portion, such that the generation of power remains substantially constant. In embodiments, the production rate of the synthesis gas is increased, optionally by increasing an amount of carbonaceous feedstock gasified to produce the synthesis gas. In embodiments, the method comprises increasing the second portion, and substantially maintaining the first portion, such that the production of Fischer-Tropsch synthesis products remains substantially constant. In embodiments, the method comprises increasing the first portion, and substantially maintaining the second portion such that the generation of power remains substantially constant.

In embodiments, the method comprises adjusting the amount of the second portion, the amount of the at least a portion of the Fischer-Tropsch tailgas, or both, to provide a power generation feed gas having a desired Wobbe index. The desired Wobbe index may be in the range of from about 200 BTU/scf to about 500 BTU/scf on an LHV. In embodiments, the amount of the second portion, the amount of the at least a portion of the Fischer-Tropsch tailgas, or both, are adjusted to provide a power generation feed gas having a substantially constant Wobbe index.

In embodiments, power is generated via a gas turbine and either an auxiliary fired boiler or an auxiliary fired heat recovery steam generator (HRSG), and the Wobbe index of a feed to the gas turbine is maintained at a desired value by adjusting an amount of Fischer-Tropsch tailgas directed to the auxiliary fired boiler or HRSG.

In embodiments of the method, the first portion comprises from about 0 volume percent to about 100 volume percent of the synthesis gas. In embodiments, the first portion comprises 100 volume percent of the synthesis gas, and the method comprises generating power from at least a portion of the Fischer-Tropsch tailgas. In embodiments, the second portion comprises from about 0 volume percent to about 100 volume percent of the synthesis gas.

In embodiments of the method, producing synthesis gas comprises introducing a carbonaceous feedstock into a pyrolyzer of a dual fluidized bed gasifier. In embodiments, the method comprises conditioning at least a portion of the synthesis gas. In embodiments, conditioning comprises subjecting the at least a portion of the synthesis gas to partial oxidation. In embodiments, conditioning comprises producing steam. The method may further comprise utilizing at least a high pressure portion of the steam in generating power. In embodiments, conditioning comprises producing enriched air; quenching; recovering heat; compressing; removing sulfur; or a combination thereof. In embodiments, conditioning comprises: altering the composition of the at least a portion of the synthesis gas by contact with enriched air to produce an altered synthesis gas; quenching the altered synthesis gas; recovering heat from the quenched, altered synthesis gas, to provide a lower temperature synthesis gas; compressing the lower temperature synthesis gas; and removing sulfur from the compressed, lower temperature synthesis gas. Recovering heat may provide a high pressure steam, and the method may further comprise utilizing at least a portion of the high pressure steam to generate power.

In embodiments of the method, producing Fischer-Tropsch synthesis products and Fischer-Tropsch tailgas from a first portion of the synthesis gas comprises introducing the first portion into a Fischer-Tropsch synthesis reactor, wherein the first portion is contacted with a Fischer-Tropsch catalyst under Fischer-Tropsch synthesis conditions. The Fischer-Tropsch catalyst may be iron-based.

In embodiments, the method comprises upgrading at least a portion of the Fischer-Tropsch synthesis products. In embodiments, the method comprises recovering hydrogen from a third portion of the synthesis gas. The method may comprise utilizing at least a portion of the recovered hydrogen to upgrade at least a portion of the Fischer-Tropsch synthesis products.

In embodiments, the Fischer-Tropsch synthesis products comprise a primarily diesel product, a primarily naphtha product, or comprises primarily diesel and naphtha products. In embodiments, the method comprises producing Fischer-Tropsch steam, and may optionally comprise utilizing at least a portion of the Fischer-Tropsch steam to generate power. In embodiments, producing synthesis gas comprises gasifying a carbonaceous feedstock comprising biomass.

Also disclosed herein is a gasification system comprising: a gasifier operable to produce, from a carbonaceous feedstock, a gasification product gas comprising hydrogen and carbon monoxide; a Fischer-Tropsch synthesis reactor configured to produce Fischer-Tropsch synthesis products and a Fischer-Tropsch tailgas from a first portion of the gasification product gas; and power production apparatus configured to generate power from a second portion of the gasification product gas, at least a portion of the Fischer-Tropsch tailgas, or both. In embodiments, the system optionally comprises conditioning apparatus configured to alter the composition of the gasification product gas, and the system comprises: (a) a fluid connection between the gasifier and the Fischer-Tropsch synthesis reactor; a fluid connection between the synthesis gas conditioning apparatus and the Fischer-Tropsch synthesis reactor; or both; and (b) a fluid connection between the gasifier and the power production apparatus; a fluid connection between the synthesis gas conditioning apparatus and the power production apparatus; or both. The system may comprise product upgrading apparatus configured to alter the composition of at least a portion of the Fischer-Tropsch synthesis products. The product upgrading apparatus may be configured to provide at least one product selected from the group consisting of primarily naphtha products and primarily diesel products.

In embodiments, the system comprises hydrogen recovery apparatus configured to recover hydrogen from a third portion of the gasification product gas. In embodiments, the hydrogen recovery apparatus is fluidly connected with a product upgrading apparatus, such that at least a portion of the recovered hydrogen can be introduced into the product upgrading apparatus, and the product upgrading apparatus is configured to alter the composition of at least a portion of the Fischer-Tropsch synthesis products.

In embodiments, the system comprises conditioning apparatus configured to adjust the composition of the gasification product gas. The conditioning apparatus may be configured to alter the molar ratio of hydrogen to carbon monoxide in the gasification product gas, to reduce the amount of at least one undesirable component therein, or both. In embodiments, the conditioning apparatus comprises a partial oxidation reactor. The partial oxidation reactor may be configured for operation at at least one temperature in the range of from about 1100° C. to about 1315° C., and at least one pressure in the range of from about 165 kPa to about 441 kPa. The partial oxidation reactor may be configured to provide a conditioned gasification product gas having a molar ratio of hydrogen to carbon monoxide in the range of from about 0.7 to about 1.5. In embodiments, the conditioning apparatus comprises at least one apparatus selected from the group consisting of partial oxidation reactors, heat recovery apparatus, quenching apparatus, pressure swing adsorbers, vacuum swing adsorbers, compressors, sulfur removal apparatus, and combinations thereof. In embodiments, the conditioning apparatus comprises one or more apparatus selected from the group consisting of partial oxidation reactors, heat recovery apparatus, quenching apparatus, air-enrichment apparatus configured to provide oxygen-enriched air, sulfur removal apparatus, and combinations thereof.

In embodiments, the system comprises feedstock handling apparatus configured to prepare the carbonaceous feedstock for gasification. In embodiments, the gasifier comprises a dual fluidized bed gasifier. In embodiments, the gasifier is configured to produce a gasification product gas comprising hydrogen and carbon monoxide from a carbonaceous feedstock comprising biomass.

The foregoing has outlined rather broadly the features and technical advantages of the invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings, wherein like numbers indicate like parts unless otherwise apparent, and wherein.

NOTATION AND NOMENCLATURE

Figure 1:
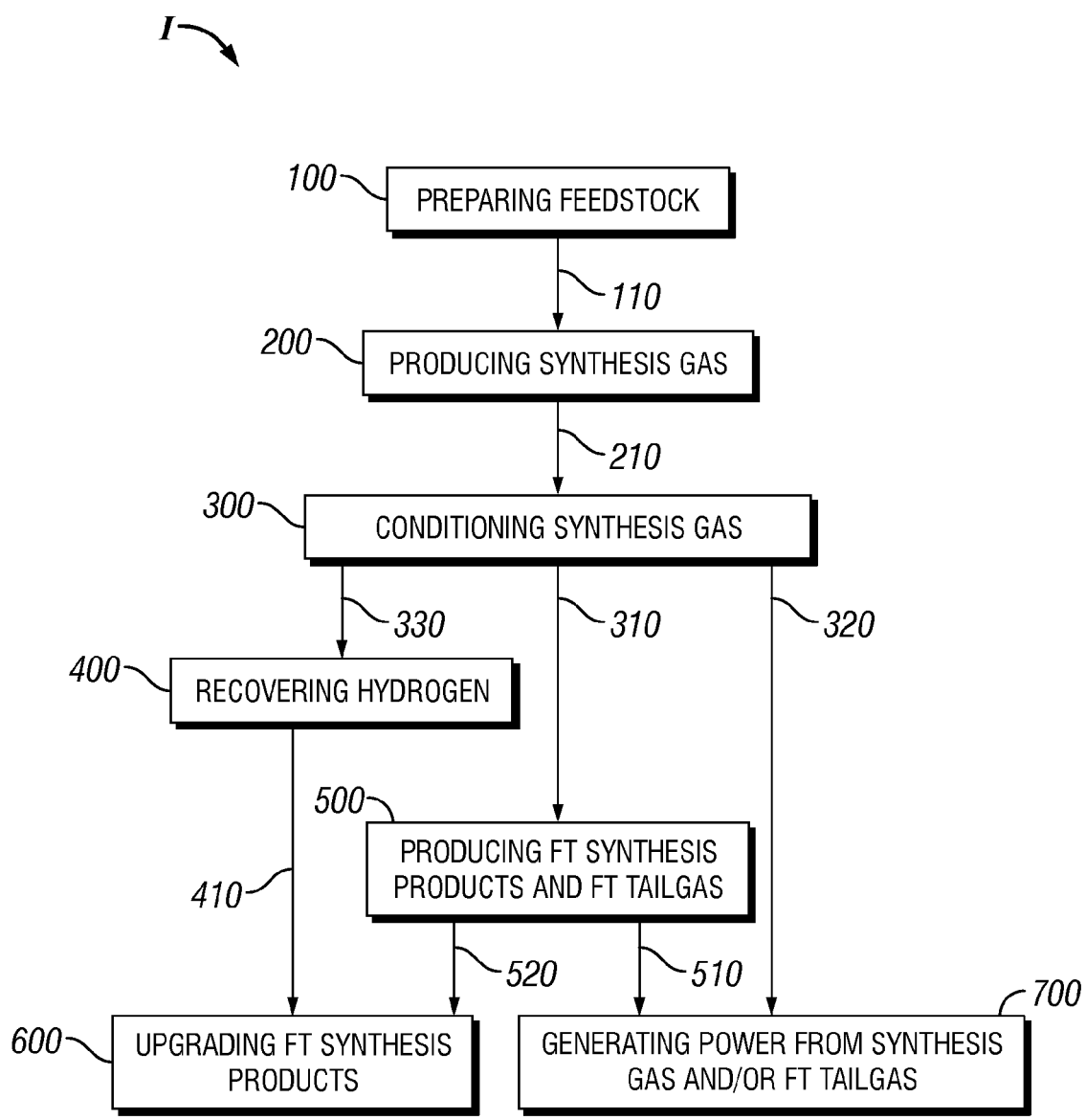
FIG. 1 is a flow diagram of a method according to an embodiment of this disclosure.

Certain terms are used throughout the following description and claims to refer to particular system components. This document does not intend to distinguish between components that differ in name but not function.

The terms 'pyrolyzer' and 'gasifier' are used interchangeably herein to refer to a reactor configured for endothermal pyrolysis.

The terms 'gasification product gas' and 'synthesis gas' are used interchangeably herein unless otherwise indicated. That is, the 'gasification product gas' comprises hydrogen and carbon monoxide, and is thus also sometimes referred to herein as 'synthesis gas' or 'syngas'.

The term 'carbonaceous feedstock' is used herein to refer to any carbon-containing material that can be gasified to produce hydrogen and carbon monoxide, including the uncondensed overhead vapors from a Fischer-Tropsch reactor, also referred to herein as 'FT tailgas'.

'LHV' is utilized herein to refer to the lower heating value, and 'HHV' is utilized herein to refer to higher heating value. Values of BTU/scf are provided herein on a LHV basis, unless otherwise noted.

DETAILED DESCRIPTION

Overview. Herein disclosed are a system and a method for the co-generation of power and Fischer-Tropsch synthesis products. The generation of power in a gasification process (e.g., a biomass gasification process), for example, via Fischer-Tropsch tailgas is complicated by the generally relatively low heating value (i.e. a low Wobbe index) of the Fischer-Tropsch tailgas. The disclosed system and method enable the consistent generation of power and/or the consistent production of Fischer-Tropsch synthesis products via utilization of a first portion of synthesis gas (also referred to herein as 'gasification product gas') for Fischer-Tropsch synthesis and a second portion of synthesis gas for power generation. Adjustment of the amounts of gasification product gas utilized in Fischer-Tropsch synthesis (i.e. the first portion) and/or power generation (i.e. the second portion) can be utilized to maintain a desired power production or FT synthesis product production rate, even when, for some reason, the total amount of gasification product gas produced (i.e. the amount of synthesis gas produced) is altered.

Utilization of a power generation feed(s) comprising Fischer-Tropsch tailgas and/or a second portion of synthesis gas bypassed around Fischer-Tropsch synthesis also allows for maintenance of a power generation feed having a desired heating value (i.e. Wobbe index). Adjustment of the amounts of gasification product gas utilized in power production (i.e. the second portion) and/or the amount of Fischer-Tropsch tailgas used in power generation can be utilized to maintain a desired power generation fuel (e.g., having a desired Wobbe index), even when, for some reason, the composition of the Fischer-Tropsch tailgas and/or the composition of the gasification product gas (i.e. the composition of a second portion thereof) changes.

Method for Co-Generation of Power and Fischer-Tropsch Synthesis Products. A method according to this disclosure will now be described with reference to FIG. 1, which is a flow diagram of a method I according to an embodiment of this disclosure. Method I comprises producing synthesis gas or 'gasification product gas' comprising hydrogen and carbon monoxide 200, producing Fischer-Tropsch synthesis products and Fischer-Tropsch tailgas 500, and generating power from synthesis gas and/or Fischer-Tropsch tailgas 700. The method may further comprise preparing feedstock for gasification 100, conditioning synthesis gas 300, recovering hydrogen 400, and/or upgrading Fischer-Tropsch synthesis products 600. Each aspect of the disclosed method will be discussed in further detail hereinbelow.

Producing Synthesis Gas 200. The disclosed method comprises producing synthesis gas from a carbonaceous feedstock 200. The synthesis gas may be produced via any method known to one of skill in the art. In embodiments, producing a gasification product gas 200 comprises introducing a carbonaceous feedstock into a pyrolyzer of a dual fluidized bed gasifier, as described further hereinbelow, and in U.S. patent application Ser. No. 13/355,732, filed Jul. 23, 2012, the disclosure of which is hereby incorporated herein in its entirety for all purposes not contrary to this disclosure. The carbonaceous feedstock may be any carbon-containing material known by one of skill in the art to be suitable for gasification. Without limitation, the carbonaceous feedstock may comprise shredded bark, wood chips, sawdust, sludges (e.g., sewage sludge), municipal solid waste (MSW), refused derived fuel (RDF), other biomass, methane, coal, Fischer-Tropsch synthesis products, spent Fischer-Tropsch catalyst/wax, or a combination thereof. In embodiments, the carbonaceous feedstock comprises biomass.

Producing Fischer-Tropsch Synthesis Products and Fischer-Tropsch Tailgas 500. The disclosed method further comprises producing Fischer-Tropsch synthesis products and Fischer-Tropsch tailgas 500. Fischer-Tropsch synthesis products and Fischer-Tropsch tailgas are produced at 500 from at least a first portion 310 of the synthesis gas produced at 200. The Fischer-Tropsch synthesis products and Fischer-Tropsch tailgas may be produced via any means known to one of skill in the art. The Fischer-Tropsch synthesis products, which may be primarily liquids at FT synthesis conditions, may comprise primarily long-chain aliphatic hydrocarbons. Producing Fischer-Tropsch synthesis products and Fischer-Tropsch tailgas 500 from a first portion 310 of the gasification product gas comprises introducing the first portion into a Fischer-Tropsch synthesis reactor, wherein the first portion is contacted with a Fischer-Tropsch catalyst under Fischer-Tropsch synthesis conditions. Such synthesis gas conditions are dependent, among other things, upon the Fischer-Tropsch catalyst utilized. In embodiments, the Fischer-Tropsch catalyst is iron-based. In embodiments, the Fischer-Tropsch catalyst is cobalt-based. In embodiments, the Fischer-Tropsch catalyst is ruthenium-based. In embodiments, the catalyst is a precipitated iron catalyst. In embodiments, the precipitated Fischer-Tropsch catalyst is an iron-based catalyst formed as described in or having the composition of Fischer-Tropsch catalyst described in U.S. Pat. No. 5,504,118 and/or U.S. patent application Ser. No. 12/189,424 (now U.S. Pat. No. 7,879,756), filed Aug. 11, 2008; 12/198,459, filed Aug. 26, 2008; 12/207,859 (now U.S. Pat. No. 9,018,128), filed Sep. 10, 2008; 12/474,552, filed May 29, 2009; and/or 12/790,101 (now U.S. Pat. No. 8,791,041), filed May 28, 2010, the disclosure of each of which is hereby incorporated herein in its entirety for all purposes not contrary to this disclosure.

It is noted that steam, i.e. Fischer-Tropsch steam, may be produced during Fischer-Tropsch product synthesis and recovery at 500. In embodiments, at least a portion of such Fischer-Tropsch steam may be utilized to generate power at 700, for example via steam turbine. For example, FT steam line 51A may fluidly connect Fischer-Tropsch synthesis apparatus 5 with power generation apparatus 7, whereby Fischer-Tropsch steam may be introduced thereto.

Generating Power from Synthesis Gas and/or Fischer-Tropsch Tailgas 700. The disclosed method further comprises, at 700, generating power from a second portion 320 of the synthesis gas and/or from the Fischer-Tropsch tailgas 510. As indicated in the embodiment of FIG. 1, the method may comprise generating power from both a second portion 320 of the gasification product gas and at least a portion 510 of the Fischer-Tropsch tailgas. In embodiments, power generation using FT tailgas is accomplished via the use of a Brayton cycle, a Rankine cycle, or a combination of thereof (i.e. a combined cycle).

As indicated in FIG. 1, a first portion 310 of the produced gasification product gas is utilized to produce Fischer-Tropsch synthesis products and Fischer-Tropsch tailgas, while a second portion 320 of the produced gasification product gas may be utilized to generate power, and/or a third portion 330 of the gasification product gas may be utilized for hydrogen recovery, as further described hereinbelow. In embodiments, from about 1 to about 30, from about 5 to about 30, or from about 10 to about 30 volume percent of the product synthesis gas (e.g., from a DFB gasifier as described further hereinbelow) is bypassed to power generation at 700 via second or bypass portion 320, and at least a portion 310 of the remaining product gas is utilized for the production of Fischer-Tropsch fuels at 500. In embodiments, at least a portion 510 of the Fischer-Tropsch tailgas from the production of Fischer-Tropsch products at 500 is blended with the bypass synthesis gas 320, to provide a gas with a suitable Wobbe number (or Wobbe index) for the production of power at 700. Depending on the power generation needs, supplemental fuel, such as natural gas, may also be introduced to the power generation system at 700.

A benefit of the disclosed method is that it enables increasing or decreasing an overall production rate of the gasification gas product gas, while maintaining the amount (e.g., the flow rate) of the first portion of the gasification product gas 310 from which FT synthesis products and FT tailgas are produced, and/or while maintaining the amount (e.g., the flow rate) of the second portion of the gasification product gas 320, from which power is generated. This may be desirable, for example, to maintain substantially constant production of Fischer-Tropsch hydrocarbons or of power. For example, should the feed of carbonaceous material to gasification at 200 be reduced for any reason and the total production of gasification product gas drop accordingly, the amount of the second or bypass portion of synthesis gas 320 utilized for power production may be reduced, while maintaining the amount of the first portion of synthesis gas 310 utilized for Fischer-Tropsch production, such that Fischer-Tropsch production remains substantially constant. And vice versa. That is, should the feed of carbonaceous material to gasification at 200 be reduced for any reason and the total production of gasification product gas drop, the amount of the first portion of synthesis gas 310 utilized for Fischer-Tropsch production may be reduced, while maintaining the amount of the second or bypass portion of synthesis gas 320 utilized for power production, such that power production remains substantially constant. Thus, the method may further comprise adjusting at least one parameter selected from the group consisting of the first portion 310 (e.g., the volumetric flow rate thereof), the second (bypass) portion 320 (e.g., the volumetric flow rate thereof), and the ratio of the first portion to the second portion 310/320 (e.g., the ratio of the volumetric flow rates thereof). In embodiments, the method comprises adjusting the at least one parameter such that the generation of power remains substantially constant. In embodiments, the method comprises adjusting the at least one parameter such that the production of Fischer-Tropsch synthesis products remains substantially constant. In embodiments, the first portion 310 of gasification product gas, from which FT synthesis products and FT tailgas are produced at 500, comprises from about 0 volume percent to about 100 volume percent of the gasification product gas, from about 60 volume percent to about 100 volume percent of the gasification product gas, or from about 85 volume percent to about 90 volume percent of the gasification product gas. In embodiments, the second or bypass portion 320 of gasification product gas, from which power is produced at 700, comprises from about 0 volume percent to about 100 volume percent of the gasification product gas, from about 0 volume percent to about 40 volume percent of the gasification product gas, or from about 10 volume percent to about 15 volume percent of the gasification product gas. In embodiments, the third portion 330 of gasification product gas, from which hydrogen is recovered at 400, comprises from about 0 volume percent to about 20 volume percent of the gasification product gas, from about 1 volume percent to about 10 volume percent of the gasification product gas, or from about 3 volume percent to about 4 volume percent of the gasification product gas.

Another aspect of the disclosed method is that the amount of the second portion 320 of synthesis gas utilized for power generation at 700, the amount of Fischer-Tropsch tailgas 510 utilized to generate power at 700, or both may be adjusted to provide a power generation feed gas having a desired Wobbe index. The desired Wobbe index will depend on the specific power generation equipment employed, as known to those of skill in the art. The disclosed system and method allow for adjustment of the gas(es) utilized for power generation, thus enabling maintenance of a power generation gas having a suitable Wobbe index (i.e. a suitable BTU/scf on an LHV) even when the composition of the bypass synthesis gas 320 utilized therefor and/or the composition of the FT tailgas 510 utilized therefor changes. Such change(s) in composition may be encountered, for example, in response to a change in carbonaceous feedstock from which the synthesis gas is produced (e.g., at 200). In embodiments, the desired Wobbe index of stream 210 is in the range of from about 200 BTU/scf to about 500 BTU/scf on an LHV, from about 200 to about 400 BTU/scf on an LHV, or from about 250 to about 500 BTU/scf on an LHV. In embodiments, the desired Wobbe index of stream 310 and/or 320 is greater than about 250, 300, or 325 BTU/scf on an LHV. In embodiments, the desired Wobbe index of stream 510 is greater than about 200, 210, or 220 BTU/scf on a LHV. In embodiments, the amount (and/or composition) of the second or bypass portion 320 of synthesis gas, which portion is utilized for power production, the amount (and/or composition) of the Fischer-Tropsch tailgas 510 from which power is generated, or both the amount of bypass portion 320 and FT tailgas 510 (and/or a composition thereof) are adjusted to provide a power generation feed gas having a substantially constant and/or minimum Wobbe index (e.g., greater than or equal to about 200, 210, 220, 250, 300, 325, or 400 BTU/scf on a LHV). In embodiments, power generation at 700 is effected via gas turbine and either an auxiliary boiler or auxiliary fired heat recovery steam generator (HRSG). The Wobbe index of the portion of gas feeding the gas turbine may be further controlled by adjusting the percentage of Fischer-Tropsch tailgas that is directed to the gas turbine and/or directly to the auxiliary fired boiler or HRSG.

Preparing Feedstock for Gasification 100. As mentioned hereinabove, the method may further comprise preparing feedstock for gasification 100. Such feedstock preparation may comprise comminution and/or grinding and will be described further hereinbelow with regard to the feedstock preparation apparatus and with reference to FIG. 3. The carbonaceous feedstock may be prepared for gasification by any means known to those of skill in the art, or may be prepared similarly to or substantially as described hereinbelow. In embodiments, at least a portion of the prepared feedstock 110 is utilized for producing synthesis gas at 200.

Conditioning Synthesis Gas 300. The disclosed method may further comprise conditioning at least a portion of the synthesis gas at 300. Although indicated in FIG. 1 as if the entirety 210 of the gasification product gas produced at 200 is conditioned at 300, it is to be understood that all or a portion of the gasification product gas may not be conditioned prior to subsequent synthesis of FT products and FT tailgas at 500, subsequent power generation at 700, and/or subsequent hydrogen recovery at 400. That is, in embodiments, conditioning synthesis gas 300 is absent from the method or is utilized on only a portion of the gas produced at 200. In other embodiments, one or more of the first portion 310 from which FT synthesis products and FT tailgas are produced, the second portion 320 from which power is generated, and/or the third portion 330 from which hydrogen is recovered is a conditioned gasification product gas. In embodiments, at least one of the portions (i.e. the first portion 310 from which FT synthesis products and FT tailgas are produced, the second or bypass portion 320 from which power is generated, and the third portion 330 from which hydrogen is recovered) is not conditioned prior to subsequent use. For example, in embodiments, a portion of the gasification gas may be bypassed around conditioning at 300 for direct utilization in power generation at 700, as further described hereinbelow.

In embodiments, the disclosed method comprises conditioning at least a portion of the gasification product gas produced at 200. Conditioning the gasification product gas at 300 can be performed by any methods known to those of skill in the art. Conditioning 300 may serve to alter the molar ratio of hydrogen to carbon monoxide in the gas conditioned and/or may serve to remove one or more undesirable components (e.g., water, sulfur, excess carbon monoxide, carbon dioxide, excess hydrogen, etc.) therefrom. In embodiments, conditioning 300 comprises subjecting at least a portion of the gasification product gas to partial oxidation. In embodiments, partial oxidation serves to provide a cleaned-up synthesis gas having molar ratio of $H_2$:CO that is suitable for Fischer-Tropsch synthesis at 500, for example, with an iron-based FT catalyst. In embodiments, partial oxidation serves to provide a cleaned-up synthesis gas having molar ratio of $H_2$:CO that is in the range of from about 0.7 to about 2.5, from about 0.9 to about 2.2, from about 0.9 to about 1.5, or from about 0.9 to about 1.4. In embodiments, partial oxidation serves to provide a cleaned-up synthesis gas comprising less than about 1.5, 1.2, or 1 volume percent $CH_4$. In embodiments, partial oxidation serves to provide a cleaned-up synthesis gas comprising less than about 3, 2.5, or 2 g/$Nm^3$ tars. Partial oxidation may be performed at a temperature of greater than or equal to about 2000° F., 2100° F., 2200° F., 2300° F., 2400° F., 2500° F., 2600° F., 2700° F., or 2800° F.

In embodiments, conditioning synthesis gas at 300 produces steam, and the method further comprises utilizing at least a portion of the steam to generate power. The steam may be a high pressure steam, for example, steam having a pressure of greater than or equal to about 3000, 3100, or 3200 kPa. In embodiments, the steam has a pressure in the range of from about 3026 to about 3200 kPa (425-450 psig). In embodiments, the steam is a low or medium pressure steam, for example, steam having a pressure of greater than 10 psig. Such steam may be suitable for uses other than power production, such as, for example, heating in a deaerator or process use. In embodiments, the steam may be superheated to improve cycle efficiency in power generation at 700.

Description of optional conditioning 300 will now be described with reference to FIG. 2, which depicts a system II according to an embodiment of this disclosure, and will be referenced in detail hereinbelow during description of the disclosed system. Conditioning 300 may comprise producing enriched air, for example via a vacuum swing adsorption (VSA) unit 31; conditioning the synthesis gas via contact with enriched air, pure oxygen, or other oxidant(s), in a synthesis gas conditioner 32, which may be a partial oxidation (POx) reactor or any other suitable apparatus known to those of skill in the art; quenching the conditioned syngas in a quench apparatus 33; recovering heat from the conditioned syngas, for example in a heat recovery/water wash 34; compressing the reduced temperature syngas exiting the heat recovery apparatus 34 via synthesis gas compressor 35; removing sulfur, for example via sulfur removal apparatus 36; or a combination thereof. The components of system II will be described in more detail hereinbelow.

In embodiments, conditioning 300 comprises altering the composition of at least a portion of the gasification product gas by contact with enriched air to produce an altered gasification product gas; quenching the altered gasification product gas; recovering heat from the quenched, altered gasification product gas to provide a lower temperature gasification product gas; compressing the lower temperature gasification product gas; and removing sulfur from the compressed, lower temperature gasification product gas. As mentioned hereinabove, as known in the art, recovering heat during conditioning may provide a high pressure steam (e.g., from boiler feed water introduced into heat recovery/water wash 34 via BFW inlet line 34A) and, in such embodiments, the method may further comprise utilizing at least a portion of the high pressure steam to generate power at 700, as indicated via HP steam line 305 in FIG. 2.

Recovering Hydrogen 400 and/or Upgrading Fischer-Tropsch Products 600. As mentioned hereinabove, the disclosed method I may further comprise recovering hydrogen at 400 from a third portion 330 of the gasification product gas, and/or upgrading Fischer-Tropsch synthesis products at 600. Recovering hydrogen from synthesis gas is well known in the art, and recovering hydrogen via a third portion 330 of the gasification product gas (which may or may not have been conditioned at 300) may be performed via any suitable means known to those of skill in the art. Recovering hydrogen from synthesis gas reduces the molar ratio of hydrogen to carbon monoxide therein, thus providing a hydrogen-rich or primarily hydrogen stream 410. Upgrading of Fischer-Tropsch products is well known in the art and such product upgrading at 600 may be performed by any suitable means. The upgraded Fischer-Tropsch products, extractable from product upgrading apparatus 61 via one or more product outlet lines 61A, 61B, may comprise one or more upgraded Fischer-Tropsch products selected from primarily wax products, primarily diesel products, primarily jet boiling range hydrocarbons, primarily gasoline boiling range hydrocarbons, primarily naphtha products, or any combination of one or more products selected from FT wax, FT diesel, FT jet, FT gasoline, and FT naphtha. As indicated in the schematic of FIG. 1, in embodiments, at least a portion of the hydrogen utilized in product upgrading at 600 is recovered via hydrogen recovery 400 and introduced to upgrading at 600, as indicated at 410.

System for Co-Generation of Power and Fischer-Tropsch Synthesis Products. Also disclosed herein is a system for the co-generation of power and Fischer-Tropsch synthesis products. Description of the disclosed system will now be made with reference to FIG. 2, which is a schematic of a system II according to this disclosure. The system comprises gasification apparatus 2, Fischer-Tropsch synthesis apparatus 5, and power generation apparatus 7. The system may further comprise feedstock handling apparatus 1, synthesis gas conditioning apparatus 3, hydrogen recovery apparatus 4 and/or Fischer-Tropsch product upgrading apparatus 6. Each of these components will be described in more detail hereinbelow.

Synthesis Gas Production Apparatus 2. The disclosed system comprises synthesis gas production apparatus 2 (also sometimes referred to herein as 'gasification apparatus 2'). Synthesis gas production apparatus 2 is operable to produce, from a carbonaceous feedstock (introducible thereto as indicated at 110), a product gas (indicated at 210) comprising hydrogen and carbon monoxide. Although sometimes referred to herein as 'gasification' apparatus and 'gasification' product gas, it is to be understood that synthesis gas production apparatus 2 is any apparatus known to those of skill in the art to be operable to provide a product gas comprising hydrogen and carbon monoxide (i.e. synthesis gas). In embodiments, gasification apparatus 2 comprises a gasifier 20. Any gasifier known in the art may be utilized within gasification apparatus 2. In embodiments, the gasifier is a dual fluidized bed gasifier as described in detail hereinbelow with regard to FIG. 3. Gasification apparatus 2 is operable to produce synthesis gas from a carbonaceous feedstock, as described above. In embodiments, the gasifier is configured to produce a gasification product gas comprising hydrogen and carbon monoxide from a carbonaceous feedstock comprising biomass.

Fischer-Tropsch Synthesis Apparatus 5. System II further comprises Fischer-Tropsch synthesis apparatus 5. Fischer-Tropsch synthesis apparatus 5 comprises a Fischer-Tropsch synthesis reactor 51 configured to produce Fischer-Tropsch synthesis products (indicated as 520 in FIG. 2) and a Fischer-Tropsch tailgas (indicated as 510 in FIG. 2) from a first portion 310 of the gasification product gas 210. Fischer-Tropsch apparatus 5 may be any Fischer-Tropsch synthesis apparatus known in the art to be suitable for the production of Fischer-Tropsch synthesis products (that are generally liquid under synthesis conditions) and a Fischer-Tropsch tailgas. The Fischer-Tropsch synthesis may be performed with any suitable Fischer-Tropsch catalyst. In embodiments, the Fischer-Tropsch synthesis is effected via contact of gasification product gas with an iron-based Fischer-Tropsch catalyst, as provided hereinabove. In embodiments, the Fischer-Tropsch synthesis is effected via contact of gasification product gas with a cobalt-based Fischer-Tropsch catalyst.

Power Generation Apparatus 7. System II further comprises power generation apparatus 7. Any suitable power generation apparatus may be utilized to generate power, so long as the system is configured for the production of power from a second or bypass portion 320 of the gasification product gas, at least a portion 510 of the Fischer-Tropsch tailgas, or both, depending on the availability and/or composition of one or both thereof. In this manner, power may be generated from Fischer-Tropsch tailgas alone, from synthesis gas alone, or from a combination thereof, depending on the composition of the Fischer-Tropsch tailgas, the composition of the synthesis gas, and/or the amount of available synthesis gas and/or Fischer-Tropsch tailgas. For example, should the amount of carbonaceous feedstock available for synthesis gas production in syngas production apparatus 2 be reduced, the total amount of synthesis gas produced therein may also be reduced. For such instances or other instances wherein the total amount of available synthesis gas is reduced, the disclosed system is designed such that the amount of synthesis gas bypass 320 that bypasses the Fischer-Tropsch synthesis apparatus 5 to the power generation apparatus 7 may be reduced concomitantly in order to maintain a desired FT synthesis level/rate. In a similar manner, should maintaining a certain level of power production be more desirable, the amount of the first portion 310 of synthesis gas that is introduced into the Fischer-Tropsch synthesis apparatus 5 may be reduced to maintain a desired power output.

In embodiments, power generation apparatus 7 comprises at least one power generation apparatus or unit 71. Power generation apparatus 71 may comprise a gas turbine. In embodiments, power generation apparatus 7 comprises a combined cycle power plant (CCPP) or a combined cycle gas turbine (CCGT) plant. In embodiments, as mentioned hereinabove, power generation apparatus 7 comprises a gas turbine and either an auxiliary boiler or auxiliary fired heat recovery steam generator (HRSG).

Synthesis Gas Conditioning Apparatus 3. As mentioned hereinabove, system II may further comprise synthesis gas conditioning apparatus 3 configured to adjust the composition of the gasification product gas 210 introduced thereto. As mentioned hereinabove, although system II of FIG. 2 indicates syngas conditioning of all of the gasification product gas 210, it is to be understood that, in embodiments, no synthesis gas conditioning apparatus 3 is utilized, while in other embodiments, the disclosed system is configured for conditioning of only a portion of the gasification product gas 210. That is, the first portion of synthesis gas 310 introduced into Fischer-Tropsch apparatus 5, the second or bypass portion 320 of gasification product gas introduced into power generation apparatus 7, and/or a third portion 330 of gasification product gas introduced into hydrogen recovery apparatus 4 (further described hereinbelow) may be conditioned, with the remainder bypassing conditioning apparatus 3.

As mentioned hereinabove, conditioning apparatus 3 may be configured to alter the molar ratio of hydrogen to carbon monoxide in the gasification product gas introduced thereto, to reduce the amount of at least one undesirable component therein, or both. For example, removing excess hydrogen or carbon monoxide from synthesis gas also alters the molar ratio of hydrogen to carbon monoxide thereof. In embodiments, conditioning apparatus 3 comprises a conditioning reactor 32. Any suitable conditioning reactor known to one of skill in the art may be utilized as conditioning reactor 32. In embodiments, conditioning reactor 32 is a partial oxidation reactor. Any suitable partial oxidation reactor known to those of skill in the art may be utilized. In embodiments, the partial oxidation reactor is configured for operation at at least one temperature in the range of from about 1100° C. (2000° F.) to about 1315° C. (2400° F.), from about 1150° C. to about 1250° C., or from about 1175° C. to about 1200° C. In embodiments, the partial oxidation reactor is configured for operation at at least one pressure in the range of from about 165 kPa (24 psia) to about 441 kPa (64 psia), from about 234 kPa (34 psia) to about 441 kPa (64 psia), or from about 303 kPa (44 psia) to about 441 kPa (64 psia). Partial oxidation reactor or synthesis gas conditioning reactor 32 may be operable at a temperature of greater than or equal to about 2000° F. (1093° C.), 2100° F. (1149° C.), 2200° F. (1204° C.), 2300° F. (1260° C.), 2400° F. (1316° C.), or 2500° F. (1371° C.). Pure oxygen and/or enriched air may be introduced via line 31B into conditioning reactor 32 via air-enrichment apparatus 31, configured to enrich air introduced into air enrichment apparatus 31 via air inlet line 31A.

Conditioning reactor 32 may be configured to provide a conditioned gas in line 32A having a molar ratio of hydrogen to carbon monoxide in the range of from about 0.7 to about 2.2, from about 0.7 to about 1.5, from about 1.0 to about 1.5, from about 1.0 to about 2.0, or from about 1.0 to about 1.1.

Such molar ratios of hydrogen to carbon monoxide may be suitable, for example, for downstream FT synthesis, for example with an iron-based FT catalyst.

Conditioning apparatus 3 may comprise one or more partial oxidation reactors, heat recovery apparatus, quenching apparatus, pressure swing adsorbers, vacuum swing adsorbers, compressors, sulfur removal apparatus, and/or some combination thereof. As indicated in the embodiment of FIG. 2, conditioning apparatus 3 may comprise apparatus 31 configured to provide enriched air to a partial oxidation reactor 32, quenching apparatus 33, heat recovery and/or water wash apparatus 34, syngas compressor 35, and/or sulfur removal apparatus 36. As mentioned hereinabove, apparatus 31 is configured to provide enriched air, via line 31B, to a synthesis gas conditioning reactor 32. In embodiments, oxygen-enrichment apparatus 31 may be selected from cryogenic oxygen production, vacuum swing adsorbers (VSA's), and pressure swing adsorbers (PSA's). Quench apparatus 33 may be configured to cool the gas stream down for lower metallurgy requirements and/or reliability of downstream units. The gas stream introduced into quench apparatus 33, for example via line 32A, may be cooled below the softening point of heat transfer material or 'HTM' (e.g., sand) and ash in the gasifier product gas, thus minimizing/preventing fouling of the downstream boiler tubes in unit(s) 33 (for example, to about 1832° F. (1000° C.). Quench apparatus 33 may be operable to freeze the CO shift reaction, preventing/minimizing the production of $CO_2$ in 33. The quench chamber may allow slag to settle from the gas stream. Quenching may thus produce a slag that is removed prior to heat recovery. Heat recovery and/or water wash apparatus 34 is configured for the recovery of heat from the synthesis gas, which may be introduced thereto from synthesis gas conditioner 32 via line 32A and/or from quenching apparatus 33 via line 33A. Heat recovery apparatus 34 may be operable to produce steam from boiler feed water (BFW) 34A. The steam may be a high pressure steam. In embodiments, as indicated in the embodiment of FIG. 2, at least a portion 305 of the steam produced in heat recovery apparatus 34 is utilized for power generation in power generation apparatus 7. In such embodiments, power generation apparatus 7 may be fluidly connected with heat recovery apparatus 34, as indicated via HP steam line 305 in FIG. 2. Syngas compressor 35 is configured to increase the pressure of the synthesis gas introduced thereto, for example, from heat recovery apparatus 34 via line 34B. Suitable compressors are well known in the art. Sulfur removal apparatus 36 is any apparatus known to those of skill in the art to be operable to extract sulfur and/or sulfur-containing contaminants from a synthesis gas introduced thereto, for example, via syngas compressor 35 and line 35A. In embodiments, sulfur removal apparatus 36 is selected from sulfur removal technologies well known in the art. In embodiments, sulfur removal apparatus 36 comprises an acid gas removal or 'AGR' apparatus. In embodiments, sulfur removal apparatus 36 operates via chemical absorption (e.g., via iron chelate amine), physical absorption (e.g., SELEXOL™), catalytic adsorption (e.g., zinc oxide), or some combination thereof.

In embodiments, the system optionally comprises conditioning apparatus 3 configured to alter the composition of the gasification product gas 210, the system comprising: (a) one or more fluid connection(s) between the gasifier 20 and the Fischer-Tropsch synthesis reactor 51; one or more fluid connection(s) between the synthesis gas conditioning apparatus 3 and the Fischer-Tropsch synthesis reactor 51; or both; and (b) one or more fluid connection(s) between the gasifier 20 and the power production apparatus 7; one or more fluid connection(s) between the synthesis gas conditioning apparatus 3 and the power generation apparatus 7; or both.

Feedstock Handling Apparatus 1. As mentioned hereinabove, system II may further comprise feedstock handling apparatus 1. Feedstock handling apparatus 1 is configured to prepare a carbonaceous feedstock for the production of synthesis gas therefrom (e.g., via gasification). Feedstock handling apparatus 1 may be configured to comminute and/or dry a carbonaceous material for gasification in gasification apparatus 2. Any suitable feedstock handling apparatus known in the art may be utilized. In embodiments, feedstock handling apparatus 1, as described hereinbelow, is incorporated into system II. In embodiments, feedstock handling apparatus 1 comprises feed receiving apparatus 17 and feedstock drying apparatus 15, fluidly connected as indicated in FIG. 1 or FIG. 2, and configured to prepare a feed material introduced via line 12 into gasification apparatus 2 via gasifier feed line 110.

Hydrogen Recovery Apparatus 4. As mentioned hereinabove, the disclosed system may further comprise hydrogen recovery apparatus 4. Hydrogen recovery apparatus 4 is any apparatus known to those of skill in the art to be operable to extract hydrogen from a synthesis gas stream 330 (e.g., an optional third portion of the gasification product gas 210) introduced thereto. In embodiments, hydrogen recovery apparatus 4 comprises one or more unit(s) 41 selected from the group consisting of absorption-based units, adsorption-based units, membranes, and combinations thereof. In embodiments, hydrogen recovery apparatus 4 comprises a hydrogen recovery unit 41 selected from the group consisting of VSA's, PSA's, and combinations thereof. One or more hydrogen recovery lines 410 is configured to extract a hydrogen-rich and/or a primarily hydrogen stream from hydrogen recovery apparatus 4.

Fischer-Tropsch Product Upgrading Apparatus 6. The system may further comprise Fischer-Tropsch product upgrading apparatus 6. Fischer-Tropsch product upgrading apparatus 6 is configured to alter the composition of at least a portion of the Fischer-Tropsch synthesis products. Suitable Fischer-Tropsch product upgrading apparatus is known in the art. In embodiments, product upgrading apparatus 6 comprises one or more product upgrading reactor 61 that operates via contact of the Fischer-Tropsch products with hydrogen. For example, product upgrading apparatus 6 may comprise hydrotreating apparatus, hydrocracking apparatus, hydroisomerization apparatus, and/or any other product upgrading apparatus known to those of skill in the art.

Figure 2:
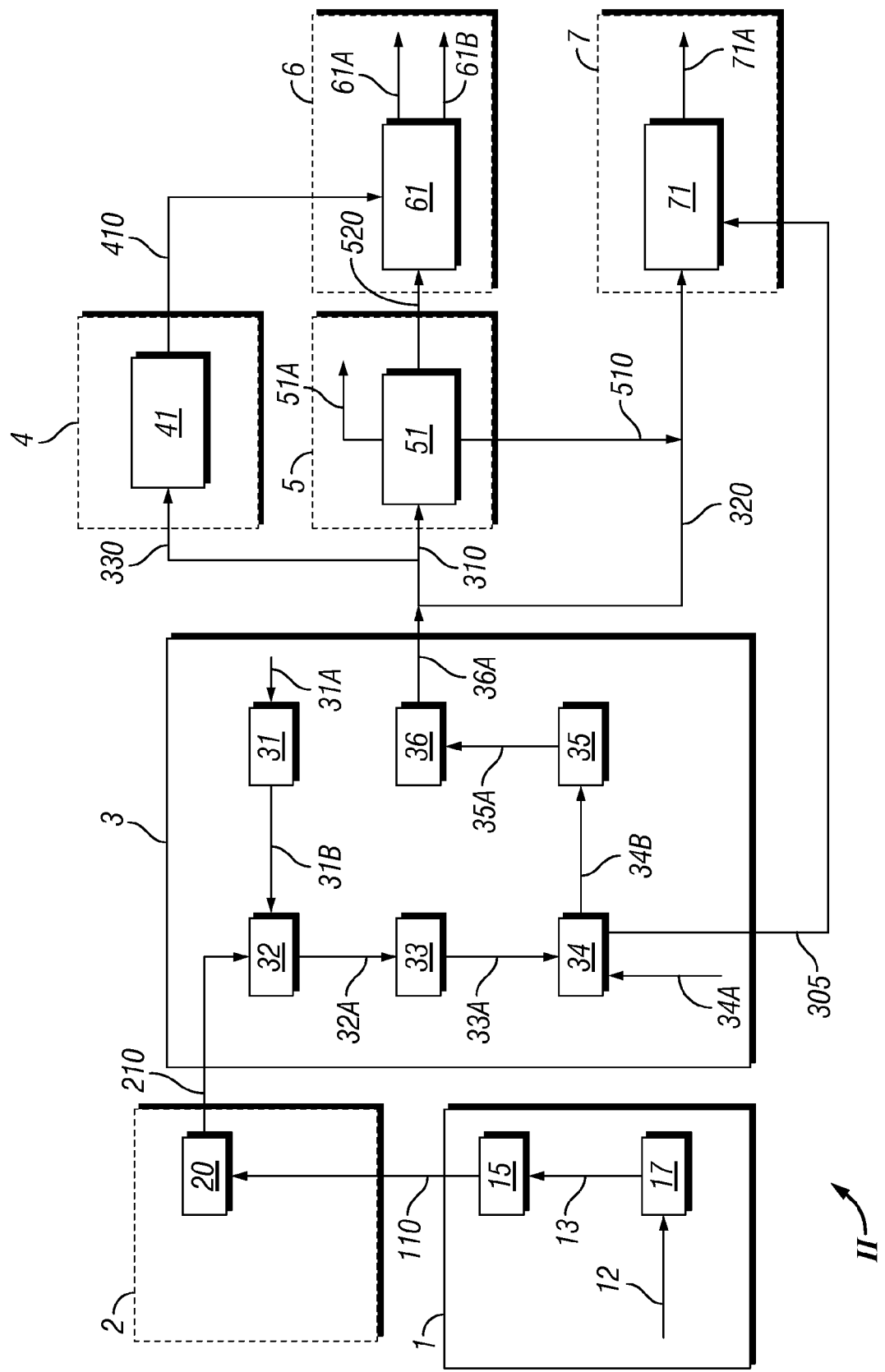
FIG. 2 is a schematic of a system according to an embodiment of this disclosure.

As indicated in FIG. 2, in embodiments, hydrogen recovery apparatus 4 is fluidly connected with product upgrading apparatus 6 such that at least a portion 410 of the recovered hydrogen can be introduced into the product upgrading apparatus 6. One or more product lines 61A, 61B are configured to extract upgraded products from the one or more product upgrading reactor(s) 61.

Dual Fluidized Bed Gasifier. As mentioned hereinabove, the system of this disclosure may comprise a dual fluidized bed gasifier or DFB. Such a dual fluidized bed gasifier is described hereinbelow with reference to FIG. 3, which is a schematic of gasification apparatus 2 (also referred to in the following DFB description as 'DFB gasifier 2') and feedstock handling apparatus 1 according to an embodiment of this disclosure. The DFB described hereinbelow enables the production of gas by use of a high throughput pyrolyzer and an external combustor, incorporating circulation of a heat transfer material (via heat transfer material transfer lines 25 and 35) to provide heat for the endothermic gasification reactions. Via the DFB, exothermic combustion reactions are separated from endothermic gasification reactions. The exothermic combustion reactions take place in or near a combustor, while the endothermic gasification reactions take place in the gasifier/pyrolyzer. This separation of endothermic and exothermic processes may provide a high energy density product gas, without the nitrogen dilution present in conventional air-blown gasification systems.

Dual fluidized bed gasifier 2 comprises combustor 30, pyrolyzer or 'gasifier' 20, combustor seal pot 70, gasifier seal pot 80, primary gasifier separator(s) 40 (e.g., heat transfer material, HTM, gasifier cyclone(s)), secondary gasifier separator(s) 50 (e.g., ash cyclone), combustor separator(s) 60 (e.g., primary and/or secondary combustor cyclones). The DFB gasifier operates by introducing inlet gas at a low gas velocity to fluidize a high average density bed in a gasifier/pyrolysis vessel. The high average density bed may comprise a relatively dense fluidized bed in a lower region thereof, the relatively dense fluidized bed containing a circulating heated relatively fine and inert particulate heat transfer material. Carbonaceous material is introduced into the lower region at a relatively high rate, and endothermal pyrolysis of the carbonaceous material is accomplished by means of a circulating heated inert material, producing a gasifier product gas comprising synthesis gas (i.e. comprising mainly hydrogen and carbon monoxide). In embodiments, in an upper region of the pyrolyzer is a lower average density entrained space region containing an entrained mixture comprising inert solid, such as ash, particulate heat transfer material, char, unreacted carbonaceous material and product gas. The entrained mixture is removed via line 114 from the gasifier to one or more separators, such as a cyclone, wherein solids (heat transfer particles, char and/or unreacted carbonaceous material) are separated from the gasification product gas. At least a portion of the removed solids is returned to the pyrolyzer after reheating to a desired temperature via passage through an exothermic reaction zone of an external combustor.

Figure 3:
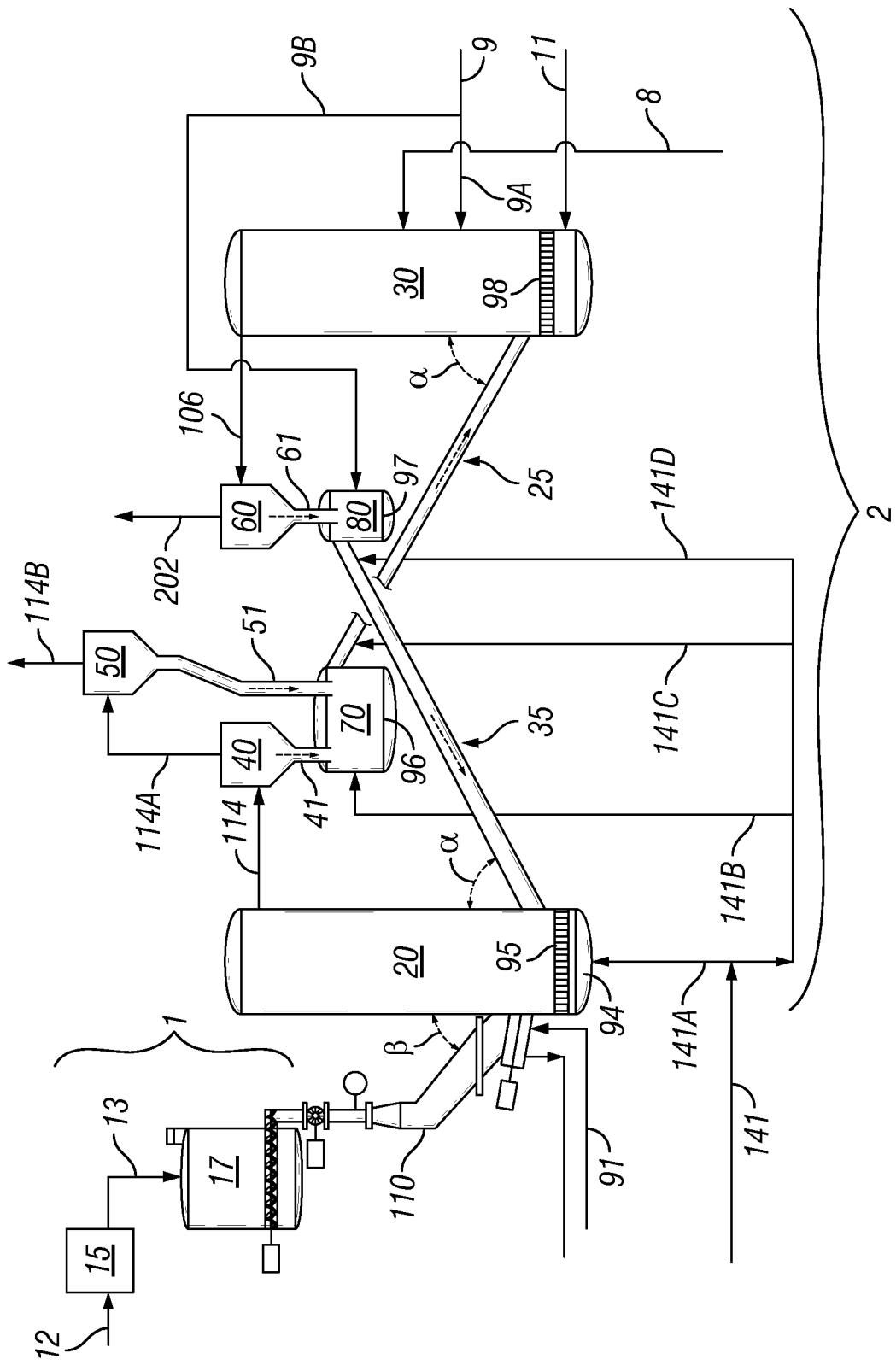
FIG. 3 is schematic of feedstock handling apparatus and gasification apparatus according to an embodiment of this disclosure.

FIG. 3 is a schematic indicating feedstock handling apparatus 1 and a dual fluidized bed (or 'DFB') gasifier 2, according to an embodiment of this disclosure. DFB gasifier 2 comprises gasifier 20 (also referred to herein as a 'pyrolyzer') that is fluidly connected with combustor 30 via heat transfer lines 25 and 35, whereby heat lost during endothermic gasification in gasifier/pyrolyzer 20 can be supplied via exothermic combustion in combustor 30, as discussed further hereinbelow. DFB gasifier 2 further comprises at least one combustor seal pot 70 and at least one gasifier seal pot 80. Pyrolyzer 20 is operable for removal therefrom of a circulating particulate phase and char by entrainment in gasifier product gas. Separation of solid, entrained particulates comprising particulate heat transfer material and char from the gasification product gas, can be accomplished by gas/solid separators, such as conventional cyclone(s). In embodiments, substantially all system solids are elutriated by the herein disclosed method despite the use of what are generally considered to be low inlet gasifier fluidization gas velocities. The DFB gasifier thus further comprises one or more gasifier particulate separator (e.g., one or more gasifier cyclone(s)) and one or more combustor particulate separator (e.g., one or more combustor cyclone(s)). In the embodiment of FIG. 3, DFB gasifier 2 comprises primary gasifier cyclone(s) 40, secondary gasifier cyclone(s) 50, and combustor cyclone(s) 60. Each of these components will be discussed in more detail hereinbelow.

Circulating between gasifier 20 and combustor 30 is a heat transfer material (HTM). Make-up heat transfer material may be into gasifier 2 via, for example, make-up heat transfer lines 9, 9A, and/or 9B. Make-up heat transfer material may be directly into gasifier 2 via, for example, lines 9 and 9A. Make-up heat transfer material may be indirectly introduced into gasifier 2 via, for example, GSP 80 via make-up heat transfer lines 9 and 9B. The heat transfer material is relatively inert compared to the carbonaceous feed material being gasified. In embodiments, the heat transfer material is selected from the group consisting of sand, limestone, and other calcites or oxides such as iron oxide, olivine, magnesia (MgO), attrition resistant alumina, carbides, silica aluminas, attrition resistant zeolites, and combinations thereof. The heat transfer material is heated by passage through an exothermic reaction zone of an external combustor. In embodiments, the heat transfer material may participate as a reactant or catalytic agent, thus 'relatively inert' as used herein with reference to the heat transfer material is as a comparison to the carbonaceous materials, and is not used herein in a strict sense. For example, in coal gasification, limestone may serve as a means for capturing sulfur to reduce sulfate emissions. Similarly, limestone may serve to catalytically crack tar in the gasifier. In embodiments, the gasifier may be considered a catalytic gasifier, and a catalyst may be introduced with or as a component of the particulate heat transfer material. For example, in embodiments, a nickel catalyst is introduced along with other heat transfer material (e.g., olivine or other heat transfer material) to promote reforming of tars, thus generating a 'clean' synthesis gas that exits the gasifier. The clean synthesis gas may be an essentially tar-free synthesis gas. In embodiments, an amount of nickel catalyst (e.g., about 5, 10, 15, or 20 weight percent nickel) is circulated along with other heat transfer materials. In embodiments, the DFB gasifier 2 is operated in conjunction with a dual nickel fluidized bed utilized as synthesis gas conditioning, optionally upstream of a partial oxidation reactor. Such a dual nickel fluidized bed is disclosed in co-pending patent application Ser. No. 12/691,297 (now U.S. Pat. No. 8,241,523), filed Jan. 21, 2010, which is hereby incorporated herein for all purposes not contrary to this disclosure.

The heat transfer material may have an average particle size in the range of from about 1 µm to about 10 mm, from about 1 µm to about 1 mm, or from about 5 µm to about 300 µm. The heat transfer material may have an average density in the range of from about 50 lb/ft$^3$ (0.8 g/cm$^3$) to about 500 lb/ft$^3$ (8 g/cm$^3$), from about 50 lb/ft$^3$ (0.8 g/cm$^3$) to about 300 lb/ft$^3$ (4.8 g/cm$^3$), or from about 100 lb/ft$^3$ (1.6 g/cm$^3$) to about 300 lb/ft$^3$ (4.8 g/cm$^3$).

In embodiments, equilibrium is pushed toward the formation of hydrogen and carbon monoxide during pyrolysis via, for example, the incorporation of a material that effectively removes carbon dioxide. For example, NaOH may be introduced into DFB 2 (e.g., to or with the heat transfer material, to gasifier 20, to combustor 30, or elsewhere) to produce $Na_2CO_3$, and/or CaO injection may be utilized to absorb $CO_2$, forming $CaCO_3$, which may later be separated into $CO_2$ and CaO which may be recycled into DFB 2. The NaOH and/or CaO may be injected into gasifier or pyrolyzer 20. Addition of such carbon dioxide reducing material may serve to increase the amount of synthesis gas produced (and thus available for downstream processes such as, without limitation, Fischer-Tropsch synthesis and non-Fischer-Tropsch chemical and/or fuel production) and/or may serve to increase the Wobbe number of the gasification product gas for downstream power production. Such or further additional materials may also be utilized to adjust the ash fusion temperature of the carbonaceous feed materials within the gasifier. As with the optional carbon dioxide reducing materials, such ash fusion adjustment material(s) may be incorporated via addition with or to the feed, with or to the heat transfer media, to gasifier 20, to combustor 30, and/or elsewhere. In embodiments, the additional material(s) are added with or to the feed to the gasifier. In embodiments, the additional material(s) are added with or to the heat transfer media.

Pyrolyzer 20 is a reactor comprising a fluidized bed of heat transfer material at the reactor base, and is operated at feed rates sufficiently high to generate enough gasifier product gas to promote circulation of heat transfer material and gasified char, for example, by entrainment. The gasifier may be a hybrid with an entrained zone above a fluidized bed gasifier, as described in U.S. Pat. No. 4,828,581, which is hereby incorporated herein by reference in its entirety for all purposes not contrary to this disclosure.

In embodiments, gasifier/pyrolyzer 20 is an annular or cylindrical shaped vessel comprising a conventional gas distribution plate 95 and/or header system near the bottom, and comprising inlets for feed material(s), heat transfer material(s), and fluidizing gas. The gasifier vessel comprises an exit at or near the top thereof and is fluidly connected thereby to one or more separators from which gasification product gas is discharged and solids are recycled to the bottom of the gasifier via an external, exothermic combustor operable to reheat the separated, heat transfer material (HTM). The gasifier operates with a recirculating particulate phase (heat transfer material), and at inlet gas velocities in the range sufficient to fluidize the heat transfer material, as further discussed hereinbelow.

Referring again to FIG. 3, the angle α between the seal pot and the vessel (i.e. between combustor seal pot 70 and combustor 30 and/or between gasifier seal pot 80 and gasifier 20) should be in the range of from about 5 to about 90°, from about 5 to about 80°, or from about 5 to about 60°. In embodiments, α is less than 45°. Utilization of a higher α generally mandates a taller seal pot. Lower angles may be operable with the use of fluidization/aeration to maintain fluidization. Generally, for α angles between 5 and about 45 degrees, fluidization/aeration may also be utilized. In embodiments, a lower angle, such as an angle of about 5 degrees, is utilized in the design so that the seal pot (CSP and/or GSP) is relatively short and the overall height of the unit (i.e. the stackup) may be reduced.

As indicated in the embodiment of FIG. 3, the inlets for feed via feed inlet line or chute 110 and recirculating heat transfer material via heat transfer line 35 are located at or near the base of gasifier 20, and may be proximate the pyrolyzer gas distributor 95. As mentioned hereinabove, the carbonaceous feed may be selected from the group consisting of biomass, RDF, MSW, sewage sludge, and combinations thereof. In embodiments, the carbonaceous feedstock comprises biomass. It is envisaged that coal may be added to gasifier 20 if it is suitable coal, and this depends on the ash fusion temperature. Refinery tank bottoms, heavy fuel oil, etc., which may, in embodiments, be contaminated with small solids may be introduced into the gasifier and/or the combustor, so long as the ash fusion temperature therein is not adversely affected. In embodiments, petcoke is ground to a size in the range suitable to ensure volatilization and fluidization within the pyrolyzer. In embodiments, petcoke is introduced into the pyrolyzer as a component of the carbonaceous feedstock. In embodiments, the gasifier feed further comprises Fischer-Tropsch synthesis products (e.g., Fischer-Tropsch wax) and/or spent catalyst (e.g., recycled spent catalyst in product wax) produced in Fischer-Tropsch synthesis apparatus 5, and a portion of the Fischer-Tropsch product(s) (e.g., Fischer-Tropsch wax in line(s) 520 and/or 61A/61B) that will crack under the operating conditions therein is recycled as feed/fuel to the gasifier.

The carbonaceous gasifier feedstock may be introduced to pyrolyzer 20 via any suitable means known to one of skill in the art. The feed may be fed to the gasifier using a water cooled rotary screw. The feed may be substantially solid and may be fed utilizing a screw feeder or a ram system. In embodiments, the feed is introduced into the gasifier as a solid. In embodiments, dual feed screws are utilized and operation is alternated therebetween, thus ensuring continuous feeding.

As indicated in FIG. 3, a gasifier feed inlet line or chute 110 may be configured to provide an angle β between the feed inlet line 10 and gasifier vessel 20. The feed inlet angle β may be in the range of from about 5 to about 20 degrees, from about 10 to about 15 degrees, or from about 5 to about 35 degrees, such that the feed flows substantially uniformly into (i.e. across the cross section thereof) of pyrolyzer 20. In this manner, feed isn't limited to one side of the pyrolyzer, for example. A purge gas may also be introduced via purge gas line 91 with the feed (for example, from a lockhopper) via the feed inlet or chute 110 to maintain a desired pressure and/or to aid in feeding the feed to the pyrolyzer. In embodiments, the purge gas is selected from the group consisting of carbon dioxide, steam, fuel gas, nitrogen, synthesis gas, flue gas from the combustor (e.g., in flue gas line 106 and/or 202), and combinations thereof. In embodiments, the purge gas comprises nitrogen. In embodiments, the feed is not purged. If $CO_2$ recovery is present, for example downstream, it may be desirable for the feed purge gas to be or to comprise carbon dioxide.

In embodiments, the gasifier feed is pressurized. The carbonaceous feed material may be fed to the gasifier at a pressure in the range of from about 0 to about 40 psig. A dryer 15 may be utilized to dry the feed and/or may be operated at a pressure, thus providing the feed material to the gasifier at a desired pressure and/or moisture content. The feed may be dried prior to introduction into the gasifier via line 13, feed bin 17, and inlet line 110, and/or may be introduced hot (e.g., at a temperature of greater than room temperature). In embodiments, the feed is cold (e.g., at a temperature of less than or equal to room temperature). The feed may be introduced into the gasifier via feed bin 17, for example, at a temperature in the range of from about −40 to about 600° F. In embodiments, the feed is at a temperature in the range of from −40 to about 250° F. In embodiments, the feed is at ambient temperature. In embodiments, the feed line 12 and/or line 110 is at ambient temperature. In embodiments, a feed material is comminuted prior to introduction into the gasifier. In embodiments, a feed material is preheated and/or comminuted (e.g., chipped) prior to introduction into the gasifier. Feed bin 107 may be operable as a dryer, as disclosed, for example, in U.S. Pat. App. No. 61/551,582, filed Oct. 26, 2011 (and U.S. patent application Ser. No. 13/651,996 claiming priority thereto and filed Oct. 15, 2012), which is hereby incorporated herein in its entirety for all purposes not contrary to this disclosure.

In embodiments, the moisture content of the feed is in the range of from about 5% to about 60%. In embodiments, the feed, line 12, has a moisture content of greater than about 10, 20, 30, or 40 wt %. In embodiments, the feed, line 13, has a moisture content of less than about 10, 20, 30, or 40 wt %. In embodiments, the moisture content of the feed is in the range of from about 20 to about 30 wt %. In embodiments, the moisture content of the feed is in the range of from about 20 to about 25 wt %.

In embodiments, more drying of the feed material may be desired/utilized to provide syngas (via, for example, feed drying, gasification and/or partial oxidation) at a molar ratio of $H_2/CO$ suitable for downstream Fischer-Tropsch synthesis in the presence of an iron catalyst (i.e. for which a molar ratio of hydrogen to carbon monoxide in the range of from about 1:1 to about 2:1, or about 1:1, may be generally desirable). In embodiments, less drying may be desired/utilized, for example, to provide a synthesis gas having a molar ratio of $H_2/CO$ suitable for downstream Fischer-Tropsch synthesis in the presence of a cobalt catalyst (i.e. for which a molar ratio of hydrogen to carbon monoxide of about 2:1 may be generally desirable). In embodiments, at least a portion of the hot combustor flue gas in line(s) 106 and/or 202 (described further hereinbelow) is utilized to dry a gasifier feed prior to introduction into gasifier 20.

In embodiments, the feed rate (flux) of carbonaceous material to the gasifier is greater than or equal to about 2000, 2500, 3000, 3400, 3500, 4000, or 4200 lb/h/ft². The design may allow for a superficial velocity at the outlet (top) of the gasifier in the range of from about 10 to about 80 ft/s, from about 20 to about 80 ft/s, or from about 20 to about 60 ft/s (assuming a certain carbon conversion/volatilization/expansion). In embodiments, the carbon conversion is in the range of from about 0 to about 100%. In embodiments, the carbon conversion is in the range of from about 30 to about 80%. The gasifier vessel size, i.e. the diameter thereof, may be selected based on a desired outlet velocity.

Gasifier fluidization gas may be fed to the bottom of gasifier 20 (for example, via a distributor 95) at a superficial velocity in the range of from about 0.5 ft/s to about 10 ft/s, from about 0.8 ft/s to about 8 ft/s, or from about 0.8 ft/s to about 7 ft/s. In embodiments, the pyrolyzer fluidization gas (e.g., steam and/or alternate fluidization gas) inlet velocity is greater than, less than, or equal to about 1, 2, 3, 4, 5, 6, 7, 8, 9, or 10 ft/s. In embodiments, a gasifier fluidization gas superficial velocity of at least or about 5, 6, 7, 8, 9, or 10 ft/s is utilized during startup.

The fluidization gas to gasifier 20 may be selected, without limitation, from the group consisting of steam, flue gas, synthesis gas, LP fuel gas, tailgas (e.g., Fischer-Tropsch tailgas, upgrader tailgas, VSA tailgas, and/or PSA tailgas) and combinations thereof. In embodiments, the gasifier fluidization gas comprises Fischer-Tropsch tailgas. In embodiments, the gasifier fluidization gas comprises upgrader tailgas.

In embodiments, the pyrolyzer fluidization gas comprises PSA tailgas. Such embodiments may provide substantial hydrogen in the gasifier product gas (e.g., in line(s) 114, 114A, and/or 114B) and may be most suitable for subsequent utilization of the product gas in downstream processes for which higher molar ratios of hydrogen to carbon monoxide are desirable (e.g., for which hydrogen to carbon monoxide molar ratios of about 1.8:1 to about 2:1 may be desired). For example, higher molar ratios of hydrogen to carbon monoxide may be desirable for downstream processes such as a nickel dual fluidized bed gasification (for which $H_2/CO$ ratio of about 1.8:1 to about 2:1 may be desired). Such a dual fluidized bed (DFB) gasifier is disclosed, for example, in U.S. patent application Ser. No. 12/691,297 (now U.S. Pat. No. 8,241,523), filed Jan. 21, 2010, the disclosure of which is hereby incorporated herein for all purposes not contrary to this disclosure. Utilization of PSA tailgas for gasifier fluidization gas may be less desirable for subsequent utilization of the gas for POx (for which $H_2/CO$ ratios closer to or about 1:1 may be more suited), as the hydrogen may be undesirably high. In embodiments, the moisture content in the gasification product gas is controlled by either drying the gasifer feed material to a moisture content of less than a desired amount (e.g., less than about 10, 11, 12, 13, 14, or 15 percent) or by selection of the gasifier fluidizing medium (e.g., steam vs. another fluidizing gas) or some combination thereof. The moisture content of the product syngas may be controlled in order to provide a suitable composition (e.g., $H_2/CO$ molar ratio) for downstream processing (e.g., for downstream POx). In embodiments, a combination of feed drying, DFB gasification and POx is utilized to provide a synthesis gas suitable for downstream Fischer-Tropsch synthesis utilizing a cobalt catalyst, an iron catalyst, or a combination thereof.

The temperature at or near the top of the gasifier (e.g., proximate entrained product removal therefrom) may be in the range of from about 1000° F. to about 1700° F., from about 1100° F. to about 1700° F., from about 1200° F. to about 1700° F., from about 1000° F. to about 1600° F., from about 1100° F. to about 1600° F., from about 1200° F. to about 1600° F., from about 1000° F. to about 1500° F., from about 1100° F. to about 1500° F., from about 1200° F. to about 1500° F., from about 1200° F. to about 1450° F., from about 1200° F. to about 1350° F., from about 1250° F. to about 1350° F., from about 1300° F. to about 1350° F., or about 1350° F.

In embodiments, the gasifier pressure is greater than about 2 psig. In embodiments, the gasifier pressure is less than or equal to about 45 psig. In embodiments, the gasifier pressure is in the range of from about 2 psig to about 45 psig.

Heat transfer material is introduced into a lower region of the gasifier. The heat transfer material may be introduced approximately opposite introduction of the gasifier feed material. To maintain suitable flow, the HTM inlet may be at an angle α in the range of from about 20 degrees to about 90 degrees, or at an angle α of greater than or about 20, 30, 40, 50, or 60 degrees. The heat transfer material may be introduced at a temperature in the range of from about 1000° F. to about 2000° F., from about 1200° F. to about 1800° F., from about 1450° F. to about 1600° F., or about 1550° F.

In embodiments, the pyrolyzer comprises a gas distributor 95. In embodiments, the heat transfer material is introduced to pyrolyzer 20 at a location at least 4, 5, 6, 7, 8, 9 or 10 inches or more above pyrolyzer gas distributor 95. The heat transfer material may be introduced at a position in the range of from about 4 to about 10 inches, or from about 4 to about 6 inches above distributor 95. In embodiments, the distributor is operable to provide a gas flow rate of at least or about 4, 5, 6, 7, 8, 9, or 10 ft/s, for example, during startup. The gasifier distributor 95 (and/or a distributor 96 in a combustor seal pot 70, a distributor 97 in a gasifier seal pot 80, and/or a distributor 98 in the combustor 30) may comprise a ring distributor, a pipe distributor, a Christmas tree distributor, or other suitable distributor design known in the art. In embodiments, the distributor comprises a pipe distributor that may be loaded through a side of the vessel for ease of nozzle replacement thereon (generally suitable in embodiments in which the running pressure is less than 12 or 15 psig inclusive). Distributors with fewer inlets (e.g., Christmas tree distributors and/or ring distributors) may be more desirable for higher pressure applications.

In embodiments, the temperature differential between the gasifier and the combustor (i.e. $T_C$-$T_G$) is maintained at less than about 200° F., 250° F., 260° F., 270° F., 280° F., 290° F., 300° F., 310° F., 320° F., 330° F., 340° F., or 350° F., or is maintained at a temperature within any range therebetween. If $T_C$-$T_G$ is greater than about 300° F., sand or other heat transfer material may be added to DFB 2 to adjust the temperature difference.

Gasifier distributor 95 may be positioned 2 to 6 feet above the refractory bottom. In embodiments, the distributor is positioned at least 2, 3, 4, 5, or at least 6 feet above the refractory bottom. Below the distributor is thus created a dead space or 'dead zone' 94, as indicated (not to scale) in the embodiment of FIG. 3. Dead zone 94 is located between the distributor and the bottom of the vessel. In embodiments, such a dead zone may be designed to facilitate removal of heat transfer material from below a distributor. Any materials that are too heavy to fluidize may settle below the distributor of a component of DFB 2, thus creating a heat sink area. Because there may be little or no fluidization below the distributor, heat transfer material may become trapped below the distributor and cool (e.g., to less than 1550° F. or to below another HTM inlet gasifier temperature). The bottom of the gasifier (or another component such as a combustor seal pot 70, a gasifier seal pot 80, or combustor 30) may be designed with two valves and a pipe whereby tramp material (which may include excess ash from, for example, the feed) may be removed during operation. The design of such a lock hopper allowing for online removal of heat transfer material from the dead zone may desirably eliminate the need for shutdown during tramp removal. As indicated, such a tramp removal system may also be utilized on the combustor, the CSP (combustor sealpot), the GSP (gasifier sealpot), or any combination of vessels, whereby materials may be removed therefrom without taking the system(s) offline.

The DFB gasifier comprises one or more gas/solid separator (e.g., one or more cyclone) on the gasifier outlet. The system may comprise primary and secondary gasifier particulate separators (e.g., primary gasifier cyclone(s) 40 and secondary gasifier cyclone(s) 50). In embodiments, the gasifier separators are operable/configured to provide a heat transfer material (HTM) removal efficiency of at least or about 98, 99, 99.9, or 99.99%. In embodiments, the primary gasifier separators 40 are operable to remove at least or about 99.99% of the heat transfer material from a gas introduced thereto. Higher removal of heat transfer material is generally desirable, as the cost of makeup particulate heat transfer material and the cost of heating same to operating temperature are considerable. The secondary gasifier particulate separator(s) (e.g., cyclones) may be configured to remove at least about 80, 85, 90 or 95% of the char (and/or ash) in the gasifier product gas introduced thereto. In embodiments, secondary gasifier separator(s) 50 are operable to remove at least about 95% of the ash and/or char introduced thereto. There may be some (desirably minimal) amount of recycle ash. The exit from the gasifier to the gasifier primary cyclones may comprise a 90 degree flange.

The product synthesis gas exiting the gasifier separators may be utilized for heat recovery in certain embodiments. In embodiments, the synthesis gas is not utilized for heat recovery prior to introduction into conditioning apparatus 3. In embodiments, the disclosed system further comprises a POx unit, a nickel dual fluidized bed gasifier and/or a boiler downstream of the gasifier separator(s) (i.e. as components of downstream processing apparatus 3). It is envisaged that heat recovery apparatus may be positioned between primary and secondary separators. When utilized for heat recovery, the temperature of the synthesis gas may be maintained at a temperature of at least 600° F., at least 650° F., at least 700° F., at least 750° F. or at least 800° F. after heat recovery. For example, maintenance of a temperature of greater than 650° F., 700° F., 750° F., 800° F., 850° F., or 900° F. may be desirable when heat recovery is upstream of tar removal (for example, to prevent condensation of tars). In embodiments, the synthesis gas is maintained at a temperature in the range of from about 650° F. to about 800° F. during heat recovery. In embodiments, the system comprises a steam superheater and optionally there-following a waste heat boiler or waste heat superheater downstream of the gasifier separators for heat recovery from the hot gasification gas comprising syngas, and for the production of steam. In embodiments, the system comprises an air preheater for heat recovery from the hot synthesis gas. In embodiments, the system comprises a boiler feedwater (BFW) preheater for heat recovery from the hot synthesis gas. The system may comprise an air preheater, (for example to preheat air for introduction into the combustor, as the introduction of hotter air into the combustor may be desirable). The system may comprise any other suitable apparatus known to those of skill in the art for heat recovery.

DFB 2 comprises a combustor 30 configured to heat the heat transfer material separated via one or more separators 40 and/or 50 (e.g., cyclones) from the gasification product comprising entrained materials extracted from the pyrolyzer via line 114. The combustor may be any type of combustor known in the art, such as, but without limitation, fluidized, entrained, and/or non-fluidized combustors.

Referring now to FIG. 3, combustor 30 is associated with a combustor seal pot 70 (CSP) configured to prevent backflow of materials into the gasifier cyclone(s) 40, 50; and one or more combustor cyclone(s) 60 configured to remove particulates from the combustor flue gas extracted from combustor 30 via combustor flue gas outlet line 106.

In embodiments, air is fed into the bottom of combustor 30 (e.g., via combustion air inlet line 11) and steam is fed into CSP 70. The steam feed rate may be about 4000 lb/h (for a plant operating at about 500 dry tons/day biomass feed rate, for example). The steam passes through and exits combustor cyclone 60. The cyclone efficiency is dramatically affected by the superficial velocity thereto. The higher the superficial velocity, the better the cyclone efficiency. If the ACFM (actual cubic feet per minute) can be reduced, the cyclone efficiency may be improved (based on more solids per cubic foot). Thus, in embodiments, air is fed into CSP 70, rather than steam. In embodiments, 20-25% of the fluidization gas (e.g., air) for combustor 30 is introduced into or via CSP 70. In embodiments, combustion air, rather than steam, is fed into CSP 70 (e.g., via line 141B), such that heat is not removed from combustor 30 due to the flow of steam therethrough, and the downstream combustor separator(s)/cyclone(s) 60 and/or the downstream gasifier 20 may be incrementally smaller in size. That is, the introduction of air (e.g., at about 1000° F.), rather than the introduction of (e.g., 550° F.) steam into CSP 70 (which is heated therein to, for example, about 1800° F.) may serve to reduce the amount of steam in gasification apparatus 2. This may allow the downstream vessel(s) to be smaller. When air is introduced into CSP 70, partial combustion of char may occur in the seal pot with air (rather than steam) and the downstream combustor cyclone(s) 60 and/or gasifier 20 may be smaller. Accordingly, in embodiments the combustor is reduced in size by introduction of a portion of the combustor fluidization gas into CSP 70. For example, if the desired fluidization velocity at the top (e.g., proximate the flue gas exit) of the combustor is 30-35 ft/s, only about 75-80% (i.e. about 20 feet/s) may need to be introduced into the bottom of the combustor because 20-25% of the fluidization gas may be introduced into or via CSP 70. Thus, the combustor size may be reduced. Another benefit of introducing combustor fluidization gas via the CSP is that the combustor cyclone(s) can be incrementally smaller and/or may be operated more efficiently. Also, nitrogen in the air can be heated and thermal efficiency gained by eliminating or reducing the need for superheating steam (e.g., at 4000 lb/h of steam). (When steam is utilized, there may be a substantial loss of the steam. Very little heat may be recoverable therefrom, although the steam may flow through a downstream heat exchanger on, for example, the flue gas line 202).

In embodiments, the fluidization gas for one or more of the gasifier 20 (e.g., in line(s) 141, 141A, and/or 141D), the gasifier seal pot 80 (e.g., in line(s) 141D and/or 9B), the combustor seal pot 70 (e.g., in line(s) 141 and 141B), and the combustor 30 (e.g., in line(s) 8, 9, 9A, and/or 11) comprises LP fuel gas. The fluidization gas in combustor 30 may comprise primarily air. The gas feed rate to the combustor may be greater than, less than, or about 10, 15, 20, 25, 30, or 35 feet/s in certain embodiments.

The slope from combustor seal pot 70 into combustor 30 provides angle α, such that the heat transfer media (e.g., sand), air and flue gas will flow over and back into the combustor. The inlet flow of fluidization gas into the combustor may be determined by the heat transfer material. The inlet fluidization velocity is at least that amount sufficient to fluidize the heat transfer media within combustor 30. In embodiments, the inlet velocity to the combustor is greater than or about 10, 15, 20, 25, or 30 ft/s. In embodiments, the inlet velocity of fluidization gas into the bottom of the combustor is in the range of from about 15 to about 35 ft/s, from about 20 to about 35 ft/s, or from about 20 to about 30 ft/s. At higher elevations in the combustor, flue gas is created. This limits the suitable rate for introduction of fluidization gas into the combustor.

In embodiments, the combustor is operated in entrained flow mode. In embodiments, the combustor is operated in transport bed mode. In embodiments, the combustor is operated in choke flow mode. The bottom of the combustor (for example, at or near the inlet of circulating heat transfer media from the gasifier) may be operated at approximately 1100° F., 1200° F., 1300° F., or 1400° F., and the exit of the combustor (at or near the top thereof; for example, at or near the exit of materials to cyclone(s)) may be operated at approximately 1400° F., 1500° F., 1600° F., 1700° F., 1800° F., or 1900° F. Thus, the actual cubic feet of gas present increases with elevation in the combustor (due to combustion of the char and/or supplemental fuel introduced via supplemental fuel inlet line 8, along with combustion air in line 11, and/or along with make-up heat transfer material introduced via make-up heat transfer material lines 9 and 9A). In embodiments, excess air or flue gas is returned to the combustor, for example, to reduce NOx and/or preheat combustion air.

The fluidization gas for the combustor may be or may comprise oxygen in air, oxygen-enriched air, substantially pure oxygen, for example, from a vacuum swing adsorption unit (VSA) or a pressure swing adsorption unit (PSA), oxygen from a cryogenic distillation unit, oxygen from a pipeline, from an air separation unit, or a combination thereof. The use of oxygen or oxygen-enriched air may allow for a reduction in vessel size, however, the ash fusion temperature must be considered. The higher the oxygen concentration in the combustor feed, the higher the temperature of combustion. The oxygen concentration and combustion fuel is kept at a value which maintains a combustion temperature less than the ash fusion temperature of the feed. Thus, the maximum oxygen concentration fed into the combustor can be selected by determining the ash fusion temperature of the specific feed utilized. In embodiments, the fluidization gas fed to the bottom of the combustor comprises from about 20 to about 100 mole percent oxygen. In embodiments, the fluidization gas comprises about 21 mole percent oxygen (e.g., air). In embodiments, the fluidization gas comprises substantially pure oxygen (limited by the ash fusion properties of the char, supplemental fuel and heat transfer material fed thereto). Supplemental fuel may be introduced via supplemental fuel inlet line 8, for example. In embodiments, the combustor fluidization gas comprises PSA tailgas.

The combustor may be designed for operation with about 10 volume percent excess oxygen in the combustion offgas. In embodiments, the combustor is operable with excess oxygen in the range of from about 0 to about 20 volume percent, from about 1 to about 14 volume percent, or from about 2 to about 10 volume percent excess $O_2$. In embodiments, the amount of excess $O_2$ fed to the combustor is greater than 1 volume percent and/or less than 14 volume percent. Desirably, enough excess air is provided in order to limit the concentration of CO in the flue gas. In embodiments, DFB gasifier 2 is operable with excess $O_2$ to the combustor in the range of greater than 1 to less than 10 volume percent, and the flue gas comprises less than 15, 10, or 7 ppm CO. In embodiments, oxygen is utilized to produce more steam. In embodiments, for example, when the hot flue gas will be introduced into a second combustor (for example, without limitation, into the combustor of a second dual fluidized bed (DFB) gasifier as disclosed, for example, in U.S. patent application Ser. No. 12/691,297 (now U.S. Pat. No. 8,241,523), filed Jan. 21, 2010, the disclosure of which is hereby incorporated herein for all purposes not contrary to this disclosure), the amount of excess oxygen may be in the range of from about 5 to about 25 percent, or may be greater than about 5, 10, 15, 20, or 25%, providing oxygen for a downstream combustor. In embodiments in which steam may be sold at value, more excess $O_2$ may be utilized to produce more steam for sale/use. In embodiments, a CO-rich, nitrogen-rich flue gas (e.g., in line(s) 106 and/or 202) is produced by operation of combustor 30 of the herein disclosed DFB gasifier at excess oxygen of greater than 7, 10 or 15%.

In embodiments, supplemental fuels may be introduced into combustor 30. The supplemental fuels may be carbonaceous or non-carbonaceous waste streams and may be gaseous, liquid, and/or solid. For example, in embodiments, spent Fischer-Tropsch wax (which may contain up to about 5, 10, 15, 20, 25, or 30 weight percent catalyst) may be introduced into the combustor (and/or the gasifier, as discussed further hereinbelow). In embodiments, spent catalyst and Fischer-Tropsch wax produced downstream in Fischer-Tropsch synthesis apparatus 5 are recycled as fuel to the combustor. As discussed further hereinbelow, such spent wax can alternatively or additionally also be introduced into the gasifier, providing that it will crack under the operating conditions therein. In embodiments, petcoke is fed to the combustor, as a fuel source. Such supplemental fuel may be introduced into combustor 30 via supplemental fuel line 8 and/or with make-up heat transfer material via lines 9 and 9A.

In embodiments, a hydrocarbon laden stream (e.g., tar that may result from a tar removal system) is introduced into the combustor for recovery of the heating value thereof. The tar may be obtained from any tar removal apparatus known in the art, for example from a liquid absorber, such as but not limited to an OLGA (e.g., a Dahlman OLGA) unit. Such removed tars comprise heavy hydrocarbons which may be reused as a component of feed/fuel to combustor 30. In embodiments, tailgas (e.g., Fischer-Tropsch tailgas, PSA tailgas, VSA tailgas and/or upgrader offgas) is utilized as a fuel to the combustor.

In embodiments, a liquid feed such as, but not limited to, refinery tank bottoms, heavy fuel oil, liquid fuel oil (LFO), Fischer-Tropsch liquids, Fischer-Tropsch waxes, and/or another material (e.g., waste material) having a heating value, is introduced into the combustor. Nozzles may be positioned above the dipleg for introduction of such liquid material(s) into the combustor. This may help the liquid flow into the downleg and avoid production of cold spots on the refractory. In this manner, circulating heat transfer material may be utilized to circulate the liquid, and the liquid may be carried into the combustor via the combustor fluidization gas (e.g., air).

Combustor 30 may be fabricated with a 2-4 inch thick hard face refractory. In embodiments, the combustor has at least 2" hard face. In embodiments, combustor 30 has at least 3" hard face. In embodiments (e.g., in lower insulation embodiments), the combustor may comprise a hard face refractory with an insulating layer surrounding the hard face. The insulating layer may be thicker than 2 inches. In embodiments, the insulation layer is thicker than the hardface layer. The hardface layer may have a higher thermal conductivity and durability than the insulating layer.

In embodiments, the combustor is substantially cylindrical. In embodiments, the combustor is non-cylindrical. In embodiments, the combustor is conical at the bottom and/or the top. In embodiments, the combustor is conical at the bottom, for example, when the fluidization gas for the combustor comprises a high concentration of oxygen. In embodiments, the combustor comprises a conical disengaging section at the top (however, this embodiment may undesirably reduce the superficial velocity into downstream combustor gas/solid separator(s) 60). In embodiments, the outlet of the combustor comprises channels configured for recycle of heat transfer material to the fluidized bed of the combustor and reduce particulate loading in primary separator(s). In embodiments, the outlet of the combustor is corrugated to reduce particulate loading on primary cyclone(s).

In embodiments, the combustor is pressurized. The combustor may be operable at a pressure of greater than 0 psig to a pressure that is at least 2 psi less than the operating pressure of the gasifier. That is, in order to maintain continuous flow of materials from the combustor back into the gasifier, the pressure of the combustor, $P_C$, at the inlet to the combustor which may be measured by a pressure gauge located proximate the flue gas exit, is less than the gasifier/pyrolyzer pressure, $P_G$. The pressure at the HTM outlet of the combustor, $P_{C,BOTTOM}$ (which must be greater than $P_G$), equals the sum of the pressure, $P_C$, at the top of the combustor and the head of pressure provided by the material in the combustor. The head of pressure provided by the heat transfer material/gas mixture within the combustor is equal to $\rho_C g h$, where $\rho_C$ is the average density of the material (e.g., the fluidized bed of heat transfer material) within the combustor, g is the gravitational acceleration, and h is the height of the 'bed' of material within the combustor. The height of material (e.g., heat transfer material such as sand, and other components such as char and etc.) within the combustor is adjusted to ensure flow of materials back to the gasifier.

Thus, $P_{C,BOTTOM}$ which equals $P_C + \rho_C g \Delta h$ must be greater than the pressure of the gasifier, $P_G$. The heights and relationships between the combustor and gasifier are selected such that adequate pressure is provided to maintain continuous flow from the combustor to the gasifier and back.

In embodiments, the operating pressure of the combustor, $P_C$, is up to or about 40, 45, or 50 psig. In embodiments, based on 30-40 ft/s design criteria for gas velocity into the combustor, the maximum operating pressure of the combustor is about 45 psig. In embodiments, if the operating pressure of the combustor is increased, then the pressure energy can be recovered by the use of an expander. Thus, in embodiments, one or more expander is positioned downstream of the combustor gas outlet and upstream of heat recovery apparatus (discussed further hereinbelow). For example, when operated with pure oxygen, the diameter of the combustor may be smaller at the bottom than the top thereof. In embodiments, an expander is incorporated after the cyclones (because cyclone efficiency increases with higher pressures). In embodiments, one or more expander is positioned upstream of one or more baghouse filters, which may be desirably operated at lower pressures. In embodiments, the system comprises an expander downstream of one or more combustor cyclones. The expander may be operable at a pressure greater than 15, 20 or 30 psig. The one or more expanders may be operable to recover PV energy.

The superficial velocity selected for the gas/solid separators (which may be cyclones) will be selected to maximize efficiency and/or reduce erosion thereof. The cyclones may be operable at a superficial velocity in the range of from about 65 to about 85 feet/s, from about 70 to about 85 feet/s, or at about 65, 70, 75, 80, or 85 ft/s.

As shown in FIG. 3, the combustor outlet may be fluidly connected via flue gas line 106 with one or more HTM cyclones 60. The one or more cyclones may be configured in any arrangement, with any number of cyclones in series and/or in parallel. For example, a first bank of cyclones (e.g., from 1 to four or more cyclones) operated in parallel may be in series with a second bank of cyclones comprising from 1 to 4 or more cyclones in parallel and so on. DFB 2 can comprise any number of banks of cyclones.

The one or more combustion HTM cyclones may be connected with one or more ash cyclones, and the ash cyclones may be followed by heat recovery. In such embodiments, the cyclones are high temperature, refractory-lined or exotic material cyclones. In embodiments, DFB gasifier 2 comprises two, three or four combustor separators in series. In embodiments, one to two banks of combustion HTM cyclones are followed by one or more banks of ash cyclones. In embodiments, two combustion HTM cyclones are followed by one or more than one combustor ash cyclone. The one or more HTM cyclone may have a performance specification of greater than 95%, greater than 99.9% or greater than 99.98% removal of heat transfer material. Two or more combustor cyclones may be utilized to achieve the desired efficiency. In embodiments, the one or more ash cyclone may be operated to remove ash, for example, in order to reduce the size of a downstream baghouse(s). In embodiments, the one or more ash cyclones are operable to provide greater than about 60%, 70%, 80%, 85% or 90% ash removal from a gas introduced thereto.

In alternative embodiments, heat recovery apparatus is positioned between the HTM cyclone(s) and the ash removal cyclone(s). In such embodiments, combustor flue gas is introduced into one or more combustor HTM cyclones. The gas exiting the one or more HTM cyclones is introduced into one or more heat recovery apparatus. The gas exiting the one or more heat recovery apparatus is then introduced into one or more ash cyclones for removal of ash therefrom. The heat recovery apparatus may comprise one or more selected from the group consisting of air preheaters (e.g., a combustion air preheater), steam superheaters, waste heat recovery units (e.g., boilers), and economizers. In embodiments, heat recovery generates steam. In such embodiments comprising heat recovery upstream of ash removal, the one or more ash removal cyclones may not be refractory-lined, i.e. the one or more ash removal cyclones may be hard faced, but lower temperature cyclone(s) relative to systems comprising ash removal upstream of heat recovery. In embodiments, the ash removal cyclones are operable at temperatures of less than 400° F., less than 350° F., or less than 300° F.

In embodiments, heat recovery is utilized to produce superheated steam. In embodiments, the superheated steam is produced at a temperature in the range of from about 250° F. to about 400° F., and a pressure in the range of from about 100 psig to about 300 psig.

In embodiments comprising heat recovery upstream of ash recovery, the face of the tubes may be built up and/or the velocity reduced in downward flow in order to minimize erosion of heat recovery apparatus (e.g., heat transfer tubes). The velocity to the cyclones in such embodiments may be less than 80, 75, 70, or 65 ft/s. If the velocity is reduced appropriately, the ash will not stick to the heat recovery apparatus (e.g., to waste heat boiler tubes and/or the superheater tubes), and will not unacceptably erode same.

In embodiments, combustor flue gas is introduced directly or indirectly to the economizer of a boiler for recovery of heat and, for example, power production.

In embodiments, DFB 2 comprises one or more disengaging box. Such a disengaging box may be utilized in place of or in addition to the combustor cyclone(s) and/or the gasifier cyclones(s). Such a disengaging box may comprise a plurality of channels. Such a disengaging box may be more desirable on the process gas (gasifier/pyrolyzer) side to further ensure that HTM is effectively removed from the gasification process gas.

As mentioned hereinabove, the seal pot fluidization gas can be or comprise another gas in addition to or in place of steam. For example, combustor flue gas and/or recycled synthesis gas may be utilized as fluidization gas for the gasifier seal pot (GSP). In embodiments, the fluidization gas for the CSP, the GSP or both comprises steam. When recycled synthesis gas is utilized for fluidization of the GSP, the synthesis gas is returned to the gasifier and may provide additional clean synthesis gas from DFB 2. By using non-steam as the fluidization gas in the seal pot(s), steam may be reduced or substantially eliminated from the product gas, thus increasing the Wobbe Number thereof, which may be beneficial for downstream processes (such as, for example, downstream power production in power generation apparatus 7). In embodiments, upgrader tailgas comprising sulfur is utilized as fluidization gas for the GSP.

Sulfur may exit DFB gasifier 2 with the process gas, the combustor flue gas, and/or with the ash. Removal of the sulfur as a solid within gasification apparatus 2 may be desired. In embodiments, ash (e.g., wood ash) from the ash removal cyclones is utilized to remove mercaptan sulfur and/or $H_2S$ from synthesis gas. In embodiments, mercaptan sulfur and/or $H_2S$ removal is performed at a pH of greater than or about 7.5, 7.7, or 8. In embodiments, the ash (e.g., wood ash) comprises, for example, NaOH and/or $Ca(OH)_2$. In embodiments, a 'sulfur-grabber' or sulfur extraction material is added with the heat transfer material, such that sulfur may be removed with ash. The sulfur-grabber may comprise a calcium material, such as calcium oxide (CaO), which may be converted to calcium sulfide and exit the DFB 2 as a solid. In embodiments, ash water (comprising NaOH and/or $Ca(OH)_2$) is utilized to scrub sulfur from the outlet gases. For example, the system may comprise a scrubbing tower for cleaning the process gas. Depending on the basicity of the ash water, it may be utilized, in embodiments, as scrubbing water. Such scrubbing may be performed upstream of an electrostatic precipitator (ESP) or other particulate separator configured to remove particulates.

Except for air, the different fluidization gases mentioned for the CSP may be utilized for the GSP as well. (In embodiments, a percentage of air (e.g., less than 4 volume percent) may be utilized on the GSP to provide higher temperature in the gasifier). The fluidization gas on the GSP may be selected, without limitation, from the group consisting of flue gas, steam, recycled synthesis gas, and combinations thereof.

For the GSP, the minimum fluidization velocity for the heat transfer material is set at any point in time. That is, the minimum initial fluidization velocity is determined by the initial average particle size (e.g., 100 μm). After a time on stream (for example, 120 days), the heat transfer material may have a reduced average particle size (e.g., about 25 μm); thus the minimum fluidization velocity changes (decreasing with time on stream/HTM size reduction). The CSP and GSP may be selected such that they have a size suitable to handle the highest anticipated fluidization velocity, i.e. generally the start-up value. In embodiments, the minimum fluidization velocity of the GSP is initially high and decreases with time. However, it is possible that, if agglomeration occurs, the minimum fluidization velocity may increase. The minimum fluidization velocity is determined by the heat transfer material, in particular by the average particle size, the density, and/or the void fraction thereof. In embodiments, the minimum fluidization velocity is greater than about 0.2 ft/s. In embodiments, the minimum fluidization velocity is greater than about 1.5 ft/s. As the particle size distribution (PSD) decreases, seal pot fluidization velocity decreases.

The diameter of the gasifier and/or combustor seal pot(s) may be set by the number of dipleg penetrations, i.e. the number of cyclones and/or by the angles at which the diplegs enter into the seal pot. Primary gasifier particulate separator dipleg(s) 41, secondary gasifier particulate separator dipleg(s) 51, and/or combustor particulate separator dipleg(s) 61 are indicated in FIG. 1. Diplegs may be angled to allow shorter dipleg length. In embodiments, combustor cyclone diplegs enter the top of the gasifier seal pots, as with the CSP (where gasifier cyclone diplegs enter the CSP). The CSP and/or the GSP may contain a distributor (96 and/or 97) configured for distributing gas uniformly across the cross-section (e.g., the diameter) thereof. In embodiments, the distributor is positioned at or near the bottom of the CSP and/or the GSP. In embodiments, to minimize/avoid erosion of the seal leg, the minimum distance between the distributor (i.e. the fluidization nozzles) at the bottom of the seal pot (GSP and/or CSP) and the bottom of the dipleg(s) projecting thereinto is 10, 11, 12, 13, 14, 15, 16, 17 or 18 inches. In embodiments, there is a distance of more than 15, 16, 17 or 18 inches between the seal pot distributor and the cyclone dipleg(s). Desirably, the dipleg-to-dipleg spacing and/or the dipleg-to-refractory ID spacing is at least 10, 11 or 12 inches. In embodiments, the dipleg-to-dipleg spacing and the dipleg-to-refractory ID spacing is at least about 12 inches. In embodiments, the diplegs are supported. Such support may be provided to minimize/prevent vibration of the diplegs. For the GSP, the seal may actually be within the dipleg of the combustor cyclone(s) and the GSP (since gasifier 20 is generally at a higher pressure than combustor separator 60).

The GSP may be designed with an adequate head of heat transfer material to minimize backflow. The height of the GSP is based on a design margin. In embodiments, the design margin is in the range of from about 1 psig to about 5 psig, or is greater than or about equal to 1, 2, 3, 4, or 5 psig. The head of heat transfer material (e.g., sand) will provide the ΔP (pressure drop) at least sufficient to prevent backflow of gas/prevent gasifier backflowing into the combustor cyclone. The distribution of nozzles in both the CSP and the GSP may be in the range of from about one to about four nozzles per square foot. In embodiments, the distributors (95, 98, 96, 97) in any or all vessels (gasifier, combustor, CSP and GSP) comprise from about one to about four nozzles per $ft^2$.

In embodiments, one or more of the seal pots (either or both a combustor seal pot, CSP, and/or a gasifier seal pot, GSP) is replaced with an L valve or a J valve. In embodiments, a suitable DFB gasifier comprises one or more J valves in place of a CSP. In embodiments, the DFB gasifier 2 comprises one or more J valves in place of a GSP. In embodiments, the DFB gasifier comprises multiple CSPs. In embodiments, the multiple CSPs are substantially identical. In embodiments, the DFB gasifier comprises multiple GSPs. In embodiments, the multiple GSPs are substantially identical. In embodiments, DFB gasifier 2 comprises at least one or one CSP and at least one or one GSP. The seal of the CSP may be within the CSP (while the seal on the GSP may simply be within a dipleg). In embodiments, a J valve is utilized on the gasifier rather than a GSP.

The height of the CSP is determined by the pressure needed for the seal, which is the differential pressure between the gasifier cyclone and the combustor. The combustor pressure plus a design margin may be utilized to determine the desired height of the CSP (i.e. the desired height of the heat transfer material therein). In embodiments, the pressure is near atmospheric. In embodiments, the ΔP is greater than 2 psig. In embodiments, the ΔP is in the range of from about 2 psig to about 25 psig, from about 2 psig to about 20 psig, or from about 2 psig to about 15 psig. In embodiments, the pressure differential is about 10, 12, 15, or 20 psig. Desirably, the ΔP is not less than about 2 psig, as pressure equalization is undesirable. In embodiments, a smaller ΔP is utilized, thus allowing the use of a shorter CSP 70.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, and so forth). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The disclosures of all patents, patent applications, and publications cited herein are hereby incorporated by reference, to the extent they provide exemplary, procedural or other details supplementary to those set forth herein.

What is claimed is:

1. A method for generation of power and Fischer-Tropsch synthesis products, the method comprising:
producing synthesis gas comprising hydrogen and carbon monoxide, and separating into first, second, and third portions;
producing Fischer-Tropsch synthesis products and Fischer-Tropsch tailgas from the first portion of the synthesis gas;
generating power from the second portion of the synthesis gas, from at least a portion of the Fischer-Tropsch tailgas, or from both;
conditioning at least a portion of the synthesis gas, wherein conditioning comprises subjecting the at least a portion of the synthesis gas to partial oxidation by introducing the at least a portion of the synthesis gas and an oxidizing gas into a partial oxidation reactor; and
recovering hydrogen from the third portion of the synthesis gas.

2. The method of claim 1 comprising generating power from both the second portion of the synthesis gas and at least a portion of the Fischer-Tropsch tailgas.

3. The method of claim 1 further comprising increasing or decreasing an overall production rate of the synthesis gas.

4. The method of claim 1 further comprising adjusting at least one parameter selected from the group consisting of the first portion, the second portion, the ratio of the first portion to the second portion, and combinations thereof.

5. The method of claim 4 comprising adjusting the at least one parameter such that the generation of power remains substantially constant; the production of Fischer-Tropsch synthesis products remains substantially constant; or both.

6. The method of claim 5 wherein the production rate of the synthesis gas is decreased, optionally by decreasing an amount of carbonaceous feedstock gasified to produce the synthesis gas.

7. The method of claim 6 comprising reducing the second portion, and substantially maintaining the first portion, such that the production of Fischer-Tropsch synthesis products remains substantially constant.

8. The method of claim 6 comprising reducing the first portion, and substantially maintaining the second portion, such that the generation of power remains substantially constant.

9. The method of claim 5 wherein the production rate of the synthesis gas is increased, optionally by increasing an amount of carbonaceous feedstock gasified to produce the synthesis gas.

10. The method of claim 9 comprising increasing the second portion, and substantially maintaining the first portion, such that the production of Fischer-Tropsch synthesis products remains substantially constant.

11. The method of claim 9 comprising increasing the first portion, and substantially maintaining the second portion such that the generation of power remains substantially constant.

12. The method of claim 1 further comprising adjusting the amount of the second portion, the amount of the at least a portion of the Fischer-Tropsch tailgas, or both, to provide a power generation feed gas having a desired Wobbe index.

13. The method of claim 12 wherein the desired Wobbe index is in the range of from about 200 BTU/scf to about 500 BTU/scf on an LHV.

14. The method of claim 12 wherein the amount of the second portion, the amount of the at least a portion of the Fischer-Tropsch tailgas, or both, are adjusted to provide a power generation feed gas having a substantially constant Wobbe index.

15. The method of claim 1 wherein power is generated via a gas turbine and either an auxiliary fired boiler or an auxiliary fired heat recovery steam generator (HRSG), and wherein the Wobbe index of a feed to the gas turbine is maintained at a desired value by adjusting an amount of Fischer-Tropsch tailgas directed to the auxiliary fired boiler or HRSG.

16. The method of claim 1 wherein the first portion comprises from about 0 volume percent to about 100 volume percent of the synthesis gas.

17. The method of claim 16 wherein the first portion comprises 100 volume percent of the synthesis gas, and wherein the method comprises generating power from at least a portion of the Fischer-Tropsch tailgas.

18. The method of claim 16 wherein the second portion comprises from about 0 volume percent to about 100 volume percent of the synthesis gas.

19. The method of claim 1 wherein producing synthesis gas comprises introducing a carbonaceous feedstock into a pyrolyzer of a dual fluidized bed gasifier.

20. The method of claim 1 further comprising conditioning at least a portion of the synthesis gas.

21. A method for generation of power and Fischer-Tropsch synthesis products, the method comprising:
producing synthesis gas comprising hydrogen and carbon monoxide;
producing Fischer-Tropsch synthesis products and Fischer-Tropsch tailgas from a first portion of the synthesis gas; and
generating power from a second portion of the synthesis gas, from at least a portion of the Fischer-Tropsch tailgas, or from both; and
conditioning at least a portion of the synthesis gas, wherein conditioning comprises subjecting the at least a portion of the synthesis gas to partial oxidation by introducing the at least a portion of the synthesis gas and an oxidizing gas into a partial oxidation reactor.

22. The method of claim 20 wherein conditioning comprises producing steam.

23. The method of claim 22 further comprising utilizing at least a high pressure portion of the steam in generating power.

24. A method for generation of power and Fischer-Tropsch synthesis products, the method comprising:
producing synthesis gas comprising hydrogen and carbon monoxide;
producing Fischer-Tropsch synthesis products and Fischer-Tropsch tailgas from a first portion of the synthesis gas; and
generating power from a second portion of the synthesis gas, from at least a portion of the Fischer-Tropsch tailgas, or from both; and
conditioning at least a portion of the synthesis gas, wherein conditioning comprises producing an oxidizing gas comprising substantially pure oxygen, enriched air, or a combination thereof, and contacting the at least a portion of the synthesis gas therewith.

25. The method of claim 24 wherein conditioning comprises:
altering the composition of the at least a portion of the synthesis gas by contact with the oxidizing gas to produce an altered synthesis gas;
quenching the altered synthesis gas;
recovering heat from the quenched, altered synthesis gas, to provide a lower temperature synthesis gas;
compressing the lower temperature synthesis gas; and
removing sulfur from the compressed, lower temperature synthesis gas.

26. The method of claim 25 wherein recovering heat provides a high pressure steam, and wherein the method further comprises utilizing at least a portion of the high pressure steam to generate power.

27. The method of claim 1 wherein producing Fischer-Tropsch synthesis products and Fischer-Tropsch tailgas from a first portion of the synthesis gas comprises introducing the first portion into a Fischer-Tropsch synthesis reactor, wherein the first portion is contacted with a Fischer-Tropsch catalyst under Fischer-Tropsch synthesis conditions.

28. The method of claim 27 wherein the Fischer-Tropsch catalyst is iron-based.

29. The method of claim 1 further comprising upgrading at least a portion of the Fischer-Tropsch synthesis products.

30. The method of claim 1 further comprising utilizing at least a portion of the recovered hydrogen to upgrade at least a portion of the Fischer-Tropsch synthesis products.

31. The method of claim 1 wherein the Fischer-Tropsch synthesis products comprise a primarily diesel product, a primarily naphtha product, or comprises primarily diesel and naphtha products.

32. The method of claim 1 further comprising producing Fischer-Tropsch steam, and optionally utilizing at least a portion of the Fischer-Tropsch steam to generate power.

33. The method of claim 1 wherein producing synthesis gas further comprises gasifying a carbonaceous feedstock comprising biomass.

* * * * *